United States Patent
Capetz et al.

(10) Patent No.: US 8,527,310 B1
(45) Date of Patent: Sep. 3, 2013

(54) METHOD AND APPARATUS FOR CUSTOMER EXPERIENCE MANAGEMENT

(75) Inventors: Jon J. Capetz, Florham Park, NJ (US); Ann Marie Vega, Newburyport, MA (US); John Brame, Starbotton (GB); Steven Blackshaw, Scropton (GB)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 13/189,024

(22) Filed: Jul. 22, 2011

(51) Int. Cl.
*G06Q 40/00* (2012.01)
(52) U.S. Cl.
USPC .................................. 705/7.11; 705/7.42
(58) Field of Classification Search
USPC .............................................. 705/7.11, 7.42
See application file for complete search history.

(56) References Cited

U.S. PATENT DOCUMENTS

| | | | | |
|---|---|---|---|---|
| 7,577,246 | B2 * | 8/2009 | Idan et al. | 379/265.01 |
| 8,103,531 | B2 * | 1/2012 | Wollan et al. | 705/7.11 |
| 2002/0133392 | A1 * | 9/2002 | Angel et al. | 705/10 |
| 2003/0130877 | A1 * | 7/2003 | Farnes et al. | 705/7 |
| 2007/0239515 | A1 * | 10/2007 | Hernandez et al. | 705/10 |
| 2010/0138282 | A1 * | 6/2010 | Kannan et al. | 705/10 |
| 2011/0251871 | A1 * | 10/2011 | Wilson Rogers et al. | 705/7.29 |

OTHER PUBLICATIONS

"Business Benchmarking Metrics Scaffold," tmforum, Release 6.0, GB935, Version 6.1, Aug. 2010, pp. 1-25.

* cited by examiner

*Primary Examiner* — Thomas Dixon
*Assistant Examiner* — Benjamin S Fields
(74) *Attorney, Agent, or Firm* — Wall & Tong, LLP

(57) ABSTRACT

A customer experience management capability is disclosed. The customer experience management is configured to create a prioritized improvement action plan with regard to the customer experience of a customer of a service provider across all or part of the lifecycle of the relationship of the customer with the service provider.

20 Claims, 9 Drawing Sheets

METHOD AND APPARATUS FOR CUSTOMER EXPERIENCE MANAGEMENT

TECHNICAL FIELD

The invention relates generally to customer experience management and, more specifically but not exclusively, to analysis of customer experience management for improving customer experience.

BACKGROUND

The customer experience provided to a customer by a service provider within the context of the relationship between the service provider and the customer is important. As a result, many service providers attempt to manage the customer experience in an effort to improve the customer experience.

SUMMARY

Various deficiencies in the prior art are addressed by embodiments for customer experience management.

In one embodiment, an apparatus includes a processor and a memory, where the processor is configured to determine aggregate performance score information and generate customer experience management analysis results using at least a portion of the aggregate performance score information. The aggregate performance score information includes a plurality of capability performance scores associated with a respective plurality of service provider capabilities of the service provider, where the service provider capabilities are associated with a plurality of categories of a lifecycle of a relationship between the customer and the service provider, and where each service provider capability is configured to support customer experience provided to the customer by the service provider.

In one embodiment, a method includes determining aggregate performance score information and generating customer experience management analysis results using at least a portion of the aggregate performance score information. The aggregate performance score information includes a plurality of capability performance scores associated with a respective plurality of service provider capabilities of the service provider, where the service provider capabilities are associated with a plurality of categories of a lifecycle of a relationship between the customer and the service provider, and where each service provider capability is configured to support customer experience provided to the customer by the service provider.

In one embodiment, a method for evaluating customer experience management of a service provider is provided. The method includes determining aggregate performance score information and generating customer experience management analysis results using at least a portion of the aggregate performance score information. The aggregate performance score information includes a plurality of capability performance scores associated with a respective plurality of service provider capabilities of the service provider, where the service provider capabilities are associated with a plurality of categories of a lifecycle of a relationship between the customer and the service provider, and where each service provider capability is configured to support customer experience provided to the customer by the service provider.

In one embodiment, a computer-readable storage medium stores instructions which, when executed by a computer, cause the computer to perform a method for evaluating customer experience management of a service provider. The method includes determining aggregate performance score information and generating customer experience management analysis results using at least a portion of the aggregate performance score information. The aggregate performance score information includes a plurality of capability performance scores associated with a respective plurality of service provider capabilities of the service provider, where the service provider capabilities are associated with a plurality of categories of a lifecycle of a relationship between the customer and the service provider, and where each service provider capability is configured to support customer experience provided to the customer by the service provider.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION OF ILLUSTRATIVE EMBODIMENTS

Figure 1:
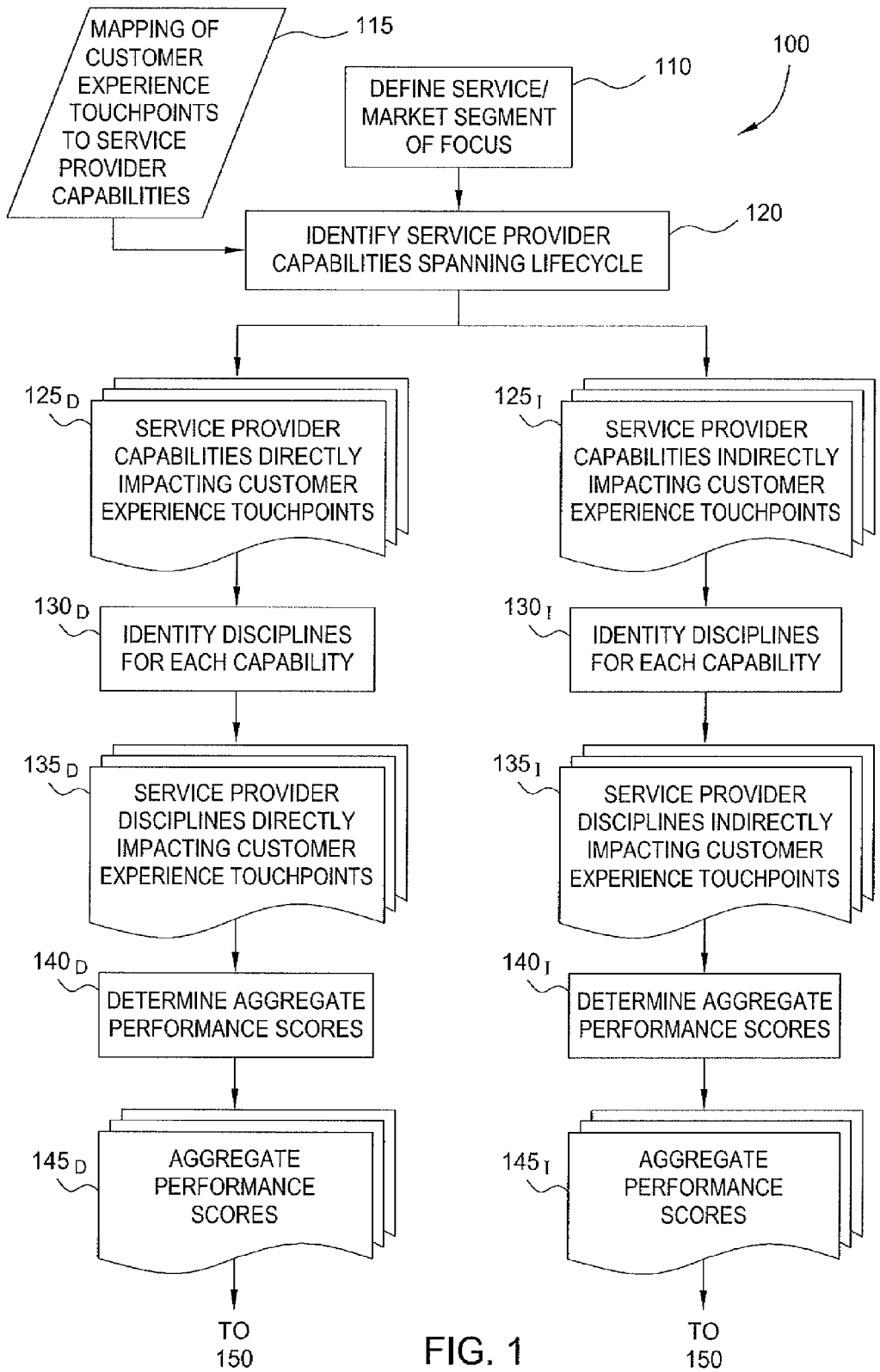
FIG. 1 depicts one embodiment of a method for analyzing customer experience management.
Figure 1:
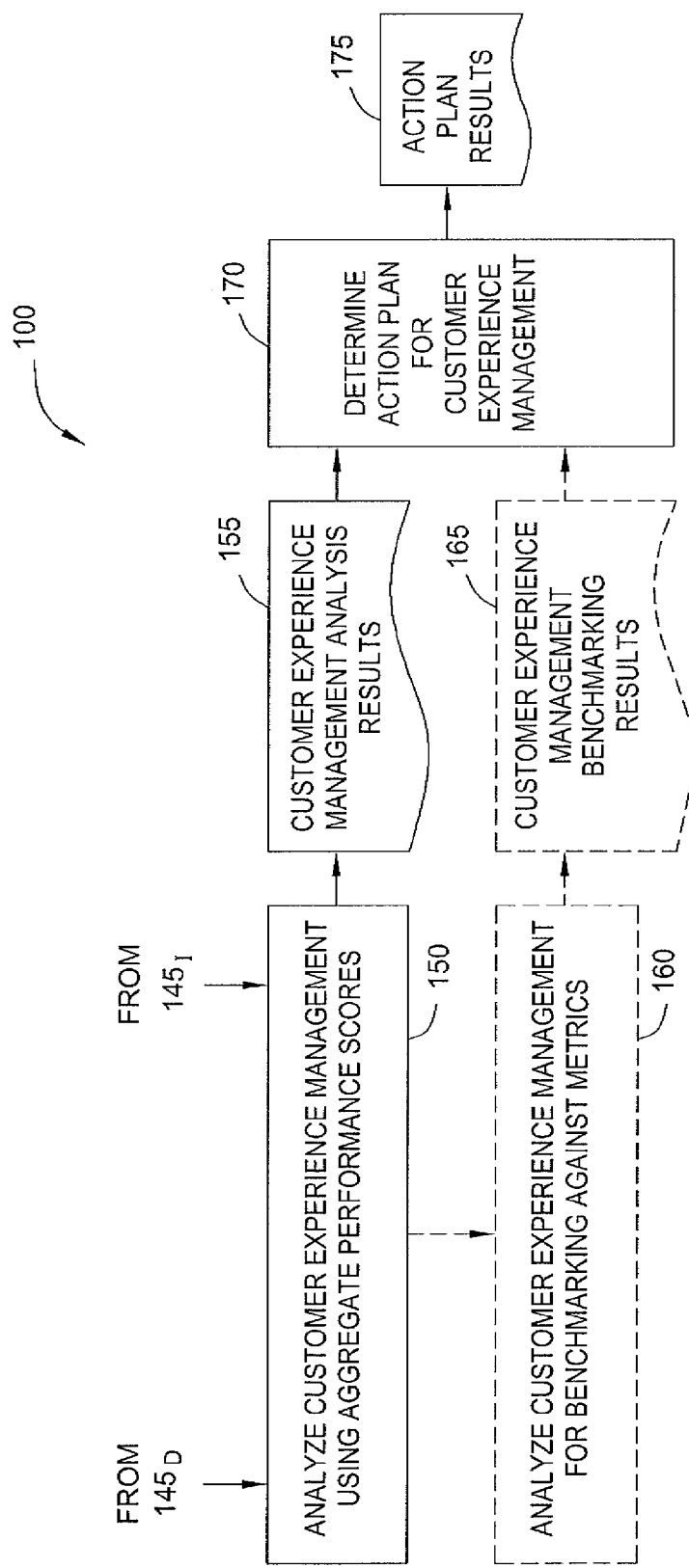

In general, a customer experience management capability is depicted and described herein, although various other capabilities also may be presented herein.

In at least some embodiments, the customer experience management capability is configured to create a prioritized improvement action plan with regard to the customer experience of a customer of a service provider across all or part of the lifecycle of the relationship of the customer with the service provider.

In at least some embodiments, the customer experience management capability is configured to enable prioritization of improvement actions across all or part of the lifecycle of the relationship of the customer with the service provider, where the lifecycle of the relationship of the customer with the service provider is supported by a set of service provider capabilities (e.g. Brand Management, Service Design, Problem Management, and the like) that directly and/or indirectly affect customer experience touchpoints associated with the lifecycle of the relationship of the customer with the service provider.

In at least some embodiments, the customer experience management capability is configured to map various aspects of all or part of the lifecycle of the relationship of the customer with the service provider to the actual service provider capabilities of the service provider which enable the service provider to provide the customer experience to the customer within the context of the relationship between the service provider and the customer.

In at least some embodiments, the customer experience management capability is configured such that customer experience touchpoints associated with all or part of the lifecycle of the relationship of the customer with the service provider are associated with service provider capabilities on a maturity curve weighted for identifying more impactful changes to service provider capabilities affecting specific customer experience touchpoints of the customer experience.

In at least some embodiments, the customer experience management capability is configured to assess capability maturity of the service provider, across all or part of the lifecycle of the relationship of the customer with the service provider, with respect to the systems, processes, and/or people of the service provider which directly and/or indirectly impact customer experience of the customer.

In at least some embodiments, the customer experience management capability is configured such that the service provider capabilities are evaluated for maturity with improvement areas identified and prioritized based on a comparison taking into account weighting of the impacts of the service provider capabilities to the customer experience (e.g., based on identification of those service provider capabilities directly and indirectly impacting the customer experience).

In at least some embodiments, the customer experience management capability is configured to support determination of a performance score for each service provider capability and is created through an assessment of one or more disciplines within each service provider capability, where the performance score is based on a combination of service provider capability maturity and weighted importance of the service provider capability with regard to the customer experience of the customer.

In at least some embodiments, the customer experience management capability is configured to use an assessment of the maturity of service provider disciplines within the service provider capabilities in conjunction with weighting of the service provider disciplines in order to calculate a normalized capability performance score for each service provider capability, thereby enabling comparison across the service provider capabilities and clear identification of strengths and/or weaknesses within each service provider capability.

In at least some embodiments, the customer experience management capability is configured to compare each of the performance scores of the service provider capabilities in a manner for ranking the performance scores of the service provider capabilities, thereby enabling determination of a prioritized approach to improving service provider capabilities and, thus, improving the customer experience.

In at least some embodiments, the customer experience management capability is configured to assess and/or adjust the assessment of scoring and comparison of service provider capabilities (and, optionally, service provider disciplines of which the service provider capabilities are composed) based on one or more of service provider requirements, customer experience strategy, and the like, as well as various combinations thereof.

In at least some embodiments, the customer experience management capability is configured to assess service provider capabilities, across all or part of the lifecycle of the relationship of the customer with the service provider, at a level of depth enabling identification of weaknesses within the service provider capabilities, creation of normalized scores for the service provider capabilities allowing cross-capability comparisons and rankings for cross-capability prioritization of identified action areas.

In at least some embodiments, the customer experience management capability is configured to organize the results of the systematic assessment and associated scoring the customer experience management capability using an interactive set of radar charts, providing a view by category/capability and/or capability/discipline, highlighting the current status of the current customer experience program of the service provider and highlighting the strengths and/or weaknesses of the current customer experience program of the service provider. This information may be used to generate a final document of results including the prioritized service provider capabilities, associated improvement actions identified during the discipline assessment, and the like, as well as various combinations thereof.

In at least some embodiments, the customer experience management capability enables the service provider to identify improvement actions (e.g., in terms of modifying one or more service provider capabilities to improve the customer experience) that have a significant impact on the customer experience based on the current maturity levels of the various service provider capabilities and the importance of the various service provider capabilities to the customer experience.

In at least some embodiments, the customer experience management capability enables the service provider to prioritize such improvement actions across all or part of the lifecycle of the relationship of the customer with the service provider (e.g., based on an understanding of which improvement actions have the largest impact of customer experience based on the current maturity levels of the service provider capabilities).

In at least some embodiments, the customer experience management capability enables the service provider to identify areas for improvement in the service provider capabilities used by the service provider to provide the customer experience to the customer, where the areas for improvement may be identified across all or part of the lifecycle of the relationship of the customer with the service provider, thereby resulting in a focused and impactful customer experience transformation plan which may be executed by the service provider to improve customer experience.

In at least some embodiments, the customer experience management capability enables the service provider to create a customer experience improvement plan in which service provider capabilities more likely to provide improvement in customer experience may be prioritized over service provider capabilities less likely to provide improvement in customer experience and, thus, in which plans for improving service provider capabilities more likely to provide associated improvement in customer experience may be prioritized over plans for improving service provider capabilities less likely to provide associated improvement in customer experience.

In at least some embodiments, the customer experience management capability enables the service provider to prioritize actions focused on customer experience improvement across operational boundaries of the service provider.

In at least some embodiments, the customer experience management capability enables the service provider to invest in areas which provide more impact on customer experience improvement and, similarly, tend to prevent the service provider from investing in areas which provide less impact on customer experience improvement.

In at least some embodiments, the customer experience management capability enables the service provider to use customer experience transformation as a business driver, especially for service providers providing devices and applications that are becoming commoditized at an increasing rate that tends to dilute some of the prior differentiating elements of offers made by the service provider.

These and various other embodiments of the customer experience management capability may be better understood by considering the various embodiments and examples set forth below.

FIG. 1 depicts one embodiment of a method for analyzing customer experience management.

As depicted in FIG. 1, method 100 is a method for analyzing customer experience management which includes various steps and associated input and output information.

At step 110, a service of focus or market segment of focus is defined. The service or market segment of focus is a service or a market segment of a service provider. The service or market segment of focus is the service or market segment for which the customer experience management is to be analyzed. The service or market segment of focus may be defined at any suitable level or granularity (e.g., for the service provider market as a whole, for one or more market segments of the service provider, for one or more services of the service provider, and the like).

At step 120, service provider capabilities are identified.

The service provider capabilities are capabilities of the service provider that span an associated lifecycle, where the lifecycle includes the customer lifecycle experienced by customers of the service provider and the service provider lifecycle utilized by the service provider in providing service to the customer (as well as the mappings therebetween).

The service provider capabilities are identified using a mapping of customer experience touchpoints to service provider capabilities 115. An exemplary mapping of customer experience touchpoints to service provider capabilities 115 is depicted and described with respect to FIG. 2.

Figure 2:
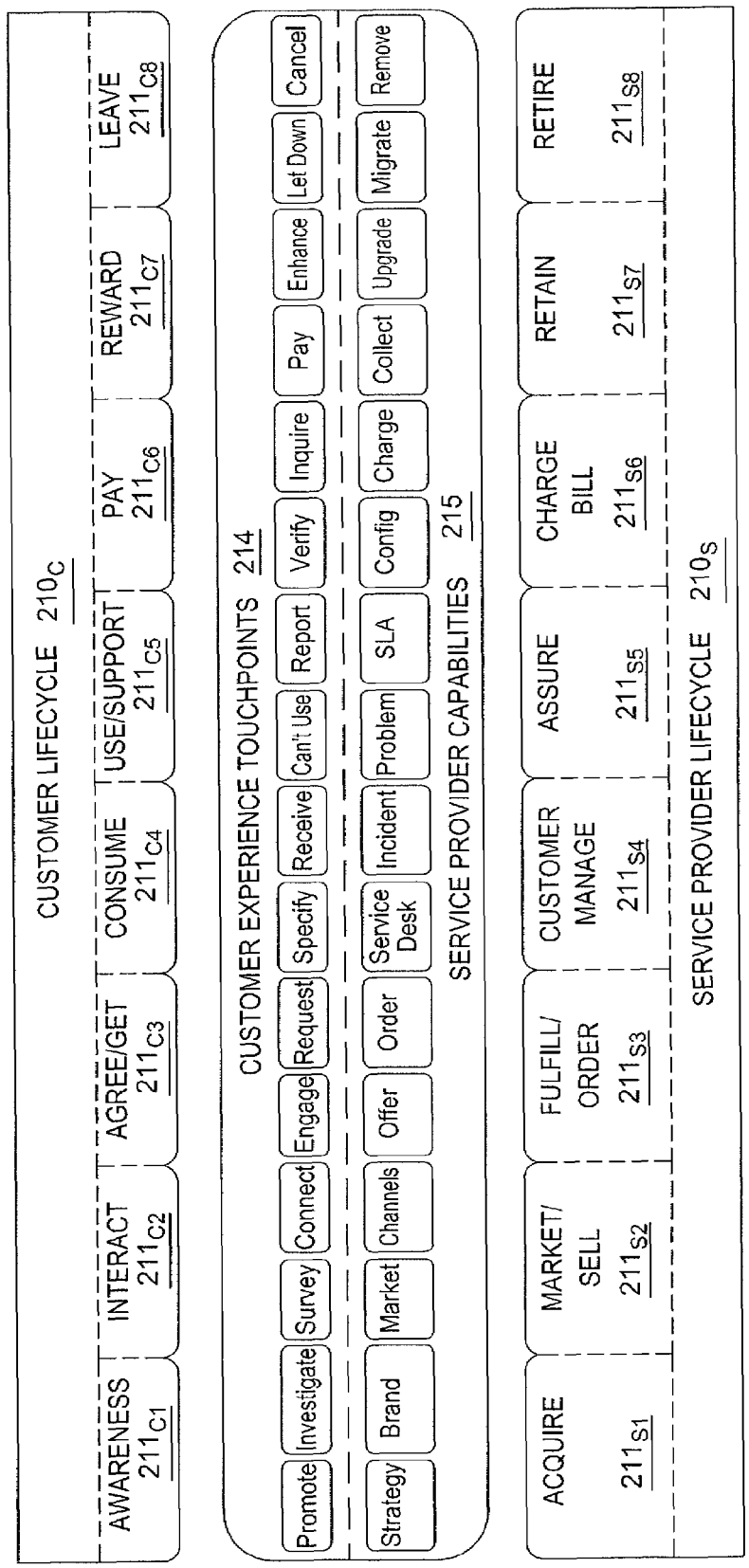
FIG. 2 depicts an exemplary mapping of a customer experience lifecycle and associated customer experience touchpoints to a service provider lifecycle and associated service provider capabilities.

FIG. 2 depicts an exemplary mapping of a customer experience lifecycle and associated customer experience touchpoints to a service provider lifecycle and associated service provider capabilities.

As depicted in FIG. 2, exemplary mapping of customer experience touchpoints to service provider capabilities (denoted as exemplary mapping 201) includes an exemplary lifecycle 210. The exemplary lifecycle 210 includes a customer lifecycle $210_C$ and a service provider lifecycle $210_S$.

In exemplary lifecycle 210, the customer lifecycle $210_C$ includes eight exemplary customer lifecycle categories $211_{C1}$-$211_{C8}$ (collectively, customer lifecycle categories $211_C$ or categories $211_C$) that are aligned temporally along customer lifecycle $210_C$ and the service provider lifecycle $210_S$ includes eight exemplary service provider lifecycle categories $211_{S1}$-$211_{S8}$ (collectively, service provider lifecycle categories $211_S$ or categories $211_S$) that are aligned temporally along service provider lifecycle $210_S$. The categories $211_C$ and $211_S$ may be referred to collectively as categories 211.

The eight exemplary customer lifecycle categories $211_{C1}$-$211_{C8}$ include Awareness $211_{C1}$, Interact $211_{C2}$, Agree/Get $211_{C3}$, Consume $211_{C4}$, Use/Support $211_{C5}$, Pay $211_{C6}$, Reward $211_{C7}$, and Leave $211_{C8}$. It is noted that the customer lifecycle categories $211_C$ are exemplary and, thus, that customer lifecycle $210_C$ may include any other suitable numbers, types, and/or arrangements of lifecycle categories.

The eight exemplary service provider categories $211_{S1}$-$211_{S8}$ include Acquire $211_{S1}$, Market/Sell $211_{S2}$, Fulfill/Order $211_{S3}$, Customer Manage $211_{S4}$, Assure $211_{S5}$, Charge Bill $211_{S6}$, Retain $211_{S7}$, and Retire $211_{S8}$. It is noted that the service provider lifecycle categories $211_S$ are exemplary and, thus, that service provider lifecycle $210_S$ may include any other suitable numbers, types, and/or arrangements of lifecycle categories.

The customer lifecycle categories $211_C$ and the service provider lifecycle categories $211_S$ map to each other as follows: Awareness $211_{C1}$ and Acquire $211_{S1}$ are mapped to each other, Interact $211_{C2}$ and Market/Sell $211_{S2}$ are mapped to each other, Agree/Get $211_{C3}$ and Fulfill/Order $211_{S3}$ are mapped to each other, Consume $211_{C4}$ and Customer Manage $211_{S4}$ are mapped to each other, Use/Support $211_{C5}$ and Assure $211_{S5}$ are mapped to each other, Pay $211_{C6}$ and Charge Bill $211_{S6}$ are mapped to each other, Reward $211_{C7}$ and Retain $211_{S7}$ are mapped to each other, and Leave $211_{C8}$ and Retire $211_{S8}$ are mapped to each other. It is noted that any other suitable mappings of customer lifecycle categories $211_C$ and service provider lifecycle categories $211_S$ may be used.

As depicted in FIG. 2, customer lifecycle $210_C$ (and, therefore, the customer lifecycle categories $211_C$) has a plurality of customer experience touchpoints 214 associated therewith. The exemplary customer experience touchpoints 214 include Promote, Investigate, Survey, Connect, Engage, Request, Specify, Receive, Can't Use, Report, Verify, Inquire, Pay, Enhance, Let Down, and Cancel. It is noted that various other types and/or numbers of customer experience touchpoints 214 may be defined as part of a customer lifecycle $210_C$.

As depicted in FIG. 2, service provider lifecycle $210_S$ (and, therefore, the service provider lifecycle categories $211_S$) has a plurality of service provider capabilities 215 associated therewith. The exemplary service provider capabilities 215 include Strategy, Brand, Market, Channels, Offer, Order, Service Desk, Incident, Problem, SLA, Configuration, Charge, Collect, Upgrade, Migrate, and Remove. It is noted that various other types and/or numbers of service provider capabilities may be defined as part of a service provider lifecycle.

As depicted in FIG. 2, the sixteen exemplary customer experience touchpoints 214 and the sixteen exemplary service provider capabilities 215 are related to each other, respectively. For example, the service provider may have a defined strategy (Strategy) for promoting (Promote) the service to customers. For example, the service provider may make a service offer (Offer) to the customer in order to engage (Engage) the customer. For example, the service provider may have a process for collecting a payment of the customer (Collect) when the customer pays for his or her service (Pay). For example, the service provider may upgrade the service (Upgrade) in response to an indication by the customer that enhanced service (Enhance) is needed or desired). The various other mappings of exemplary customer experience touchpoints 214 and exemplary service provider capabilities 215 may be better understood by way of reference to FIG. 2.

Although primarily depicted and described with respect to specific numbers, types, and orders of customer lifecycle categories $211_C$ within customer lifecycle $210_C$, customer lifecycle $210_C$ may include any other suitable numbers, types, and/or orders of customer lifecycle categories $211_C$ (e.g., fewer or more customer lifecycle categories $211_C$, different customer lifecycle categories $211_C$, different orderings of customer lifecycle categories $211_C$, and the like). Although primarily depicted and described with respect to specific numbers, types, and orders of service provider lifecycle categories $211_S$ within service provider lifecycle $210_S$, service provider lifecycle $210_S$ may include any other suitable numbers, types, and/or orders of service provider lifecycle categories $211_S$ (e.g., fewer or more service provider lifecycle categories $211_S$, different service provider lifecycle categories $211_S$, different orderings of service provider lifecycle categories $211_S$, and the like). Although primarily depicted and described with respect to a specific mapping between customer lifecycle categories $211_C$ and service provider lifecycle categories $211_S$, it is noted that any other suitable mappings may be used. It is noted that such modifications may be supported for all customers of a service provider, for subsets of customers of a service provider, and the like. It is noted that the path through the customer lifecycle $210_C$ that is followed by a customer may use any suitable number, types, and/or ordering of customer lifecycle categories $211_C$ (e.g., a current customer may call customer service about their bill, hear about a new service from the customer service representative, go to the service provider website to read more about the new service, decide to subscribe to the new service via their online account, and then use the service). As described herein, exemplary mapping of customer experience touchpoints to service provider capabilities 201 is suitable for use as mapping 115 of FIG. 1.

Returning now to FIG. 1, it is noted that, at step 120, the service provider capabilities 215 are identified in a manner for classifying the service provider capabilities 215 depending on whether the service provider capabilities 215 directly or indirectly impact customer experience touchpoints 214. The service provider capabilities 215 are identified, in a manner for classifying the service provider capabilities 215 depending on whether the service provider capabilities 215 directly or indirectly impact customer experience touchpoints 214, using a mapping of customer experience touchpoints to service provider capabilities 115. An exemplary mapping of customer experience touchpoints to service provider capabilities 115, illustrating the impact of customer experience touchpoints on service provider capabilities, is depicted and described with respect to FIG. 3.

Figure 3:
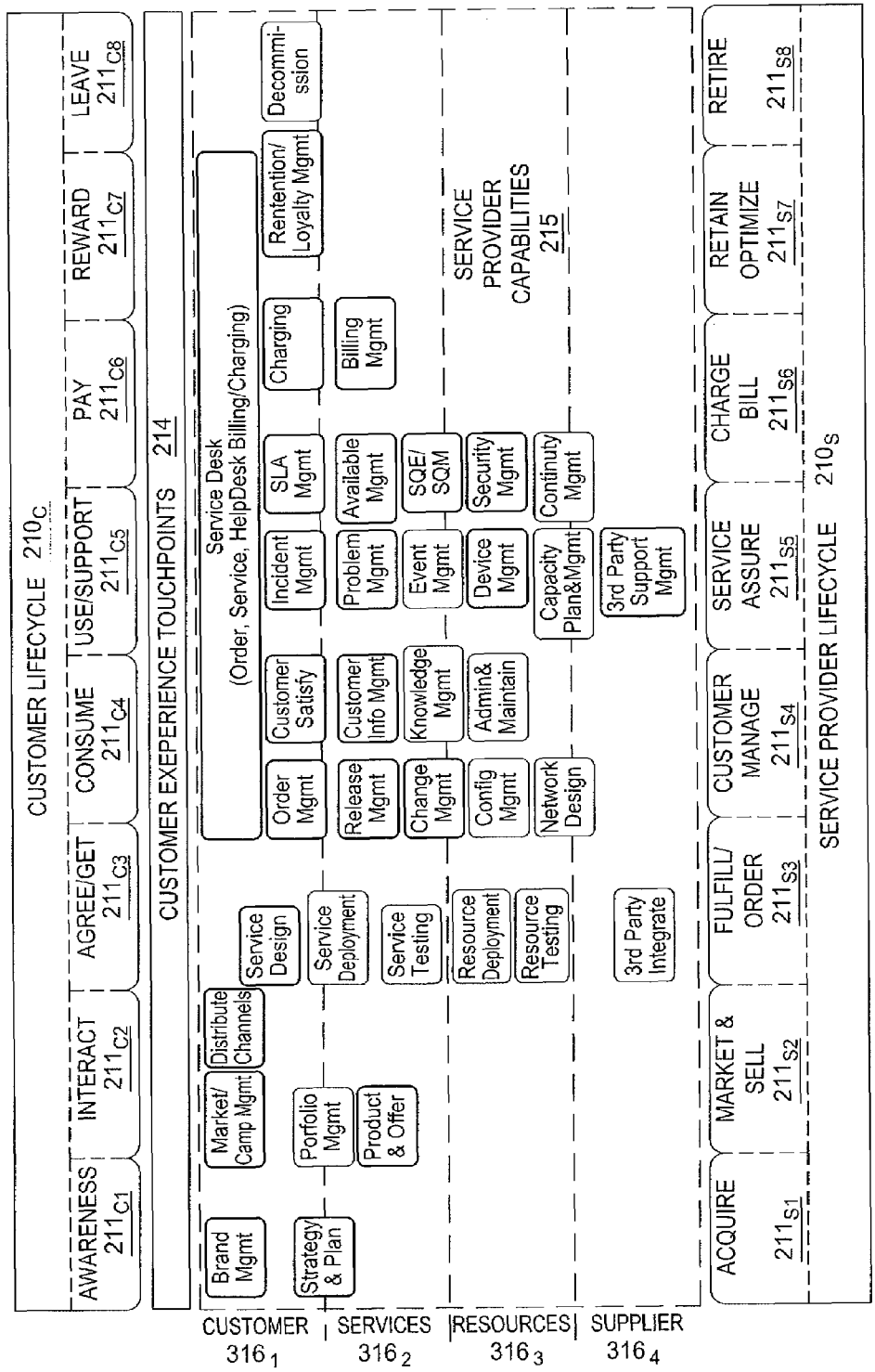
FIG. 3 depicts the exemplary mapping of customer experience touchpoints to service provider capabilities of FIG. 2, illustrating exemplary service provider capabilities that directly and indirectly impact customer experience touchpoints.

FIG. 3 depicts the exemplary mapping of customer experience touchpoints to service provider capabilities of FIG. 2, illustrating exemplary service provider capabilities that directly and indirectly impact customer experience touchpoints.

As depicted in FIG. 3, exemplary mapping 301 of FIG. 3 is similar to exemplary mapping 201 depicted and described with respect to FIG. 2. The exemplary mapping 301 of FIG. 3 includes a customer lifecycle $210_C$ having customer lifecycle categories $211_C$ and a service provider lifecycle $210_S$ having service provider lifecycle categories $211_S$. The exemplary mapping 301 of FIG. 3 includes customer experience touchpoints 214 associated with customer lifecycle categories $211_C$ and includes service provider capabilities 215 associated with service provider lifecycle categories $211_S$ (illustratively, where the service provider capabilities 215 depicted in FIG. 3 are an expanded version of the service provider capabilities 215 depicted in FIG. 2)

As depicted in FIG. 3, exemplary mapping 301 specifies classification of each of the service provider capabilities 215 in terms of (1) categories 211 of the lifecycles 210 and (2) entity types 316 identifying types of entities which may be involved, either directly or indirectly, in the process of providing service to the customer.

The categories 211 have been depicted and described with respect to exemplary mapping 201 of FIG. 2. The categories 211 are aligned along the lifecycles 210 and across the lifecycles 210. The categories $211_C$ of customer lifecycle $210_C$ are aligned temporally along the customer lifecycle $210_C$ and the categories $211_S$ of service provider lifecycle $210_S$ are aligned temporally along the service provider lifecycle $210_S$. The categories $211_C$ of customer lifecycle $210_C$ and the categories $211_S$ of service provider lifecycle $210_S$ are aligned across the lifecycles 210 as depicted and described with respect to FIG. 2.

The entity types 316 include a Customer entity type $316_1$, a Services entity type $316_2$, a Resources entity type $316_3$, and a Supplier entity type $316_4$ (collectively, entity types 316). The entity types 316 are aligned with respect to each other based on the relationships between the entity types 316 (e.g., Customer entity type $316_1$ and Services entity type $316_2$ are adjacent to each other because customers of the service provider consume services of the service provider, Services entity type $316_2$ and Resources entity type $316_3$ are adjacent to each other because the services of the service provider are supported by resources of the service provider, and Resources entity type $316_3$ and Supplier entity type $316_4$ are adjacent to each other because the resources of the service provider are obtained from suppliers of the service provider). It is noted that the resources of the service provider which are received from the suppliers of the service provider may in fact be the services that are offered by the service provider (e.g., applications for a smartphone that are offered by the service provider may be created by a third party for the service provider, in which case the resources also may be considered to be part of the service). Although primarily depicted and described with respect to specific numbers, types, and alignments of entity types 316, it is noted that various other numbers, types, and/or alignments of entity types 316 may be supported.

As depicted in FIG. 3, the categories 211 and the entity types 316 may be considered to form a grid or table, where the location of a service provider capability 215 within the grid indicates the category or categories 211 of the lifecycles 210 with which the service provider capability 215 is associated and the entity type or entity types 316 with which the service provider capability 215 is associated. It is noted that the grid or table is merely exemplary, and that the grid or table may be defined in various other ways (e.g., using different numbers, types, and/or arrangements of categories 211, using different numbers, types, and/or arrangements of entity types 316, and the like). It is further noted that the alignment presented in FIG. 3 is merely exemplary, and that each service provider capability 215 may be aligned in various other ways.

The service provider capabilities 215 include various capabilities that impact the customer experience of the customer in the relationship between the customer and the service provider. The service provider capabilities 215 include two service provider capabilities associated with Awareness $211_{C1}$/Acquire $211_{S1}$, including: (1) a Brand Management (Brand Mgmt) capability associated with Customer entity type $316_1$ and (2) a Strategy/Planning (Strategy & Plan) capability associated with Customer entity type $316_1$ and Services entity type $316_2$. The service provider capabilities 215 include four service provider capabilities associated with Interact $211_{C2}$ Market & Sell $211_{S2}$, including: (1) a Marketing/Campaign Management (Market/Camp Mgmt) capability associated with Customer entity type $316_1$, (2) a Distribute Channels capability associated with Customer entity type $316_1$, (3) a Portfolio Management (Portfolio Mgmt) capability associated with Customer entity type $316_1$ and Service entity type $316_2$, and a Product/Offer (Product & Offer) capability associated with Service entity type $316_2$. The service provider capabilities 215 include eleven service provider capabilities associated with Agree/Get $211_{C3}$/Fulfill/Order $211_{S3}$, including: (1) a Service Design capability associated with Customer entity type $316_1$, (2) an Order Management (Order Mgmt) capability associated with Customer entity type $316_1$ and Service entity type $316_2$, (3) a Service Deployment capability associated with Customer entity type $316_1$ and Service entity type $316_2$, (4) a Release Management (Release Mgmt) capability associated with Service entity type $316_2$, (5) a Service Testing capability associated with Service entity type $316_2$, (6) a Change Management (Change Mgmt) capability associated with Service entity type $316_2$ and Resources entity type $316_3$, (7) a Resource Deployment capability associated with Resources entity type $316_3$, (8) a Configuration Management (Configuration Mgmt) capability associated with Resources entity type $316_3$, (9) a Resource Testing capability associated with Resources entity type $316_3$, (10) a Network Design capability associated with Resources entity type $316_3$ and Supplier entity type $316_4$, and (11) a Third Party Integration ($3^{rd}$ Party Integrate) capability associated with Supplier entity type $316_4$. The service provider capabilities 215 include four service provider capabilities associated with Consume $211_{C4}$/Customer Manage $211_{S4}$, including: (1) a Customer Satisfy capability associated with Customer entity type $316_1$ and Service entity type $316_2$, (2) a Customer Information Management (Customer Info Mgmt) capability associated with Service entity type $316_2$, (3) a Knowledge Management (Knowledge Mgmt) capability associated with Service entity type $316_2$ and Resources entity type $316_3$, and (4) an Administration Maintenance (Admin & Maintain) capability associated with Resources entity type $316_3$. The service provider capabilities 215 include eleven service provider capabilities associated with Use/Support $211_{C5}$/Service Assurance $211_{S5}$, including: (1) an Incident Management (Incident Mgmt) capability associated with Customer entity type $316_1$ and Service entity type $316_2$, (2) an SLA Management (SLA Mgmt) capability associated with Customer entity type $316_1$ and Service entity type $316_2$, (3) a Problem Management (Problem Mgmt) capability associated with Service entity type $316_2$, (4) an Available Management capability associated with Service entity type $316_2$, (5) an Event Management (Event Mgmt) capability associated with Service entity type $316_2$ and Resources entity type $316_3$, (6) an SQE/SQM capability associated with Service entity type $316_2$ and Resources entity type $316_3$, (7) a Device Management (Device Mgmt) capability associated with Resources entity type $316_3$, (8) a Security Management (Security Mgmt) capability associated with Resources entity type $316_3$, (9) a Capacity Planning and Management (Capacity Plan & Mgmt) associated with Resources entity type $316_3$ and Supplier entity type $316_4$, (10) a Continuity Management (Continuity Mgmt) capability associated with Resources entity type $316_3$ and Supplier entity type $316_4$, and (11) a Third Party Support Management ($3^{rd}$ Party Support Mgmt) capability associated with Supplier entity type $316_4$. The service provider capabilities 215 include two service provider capabilities associated with Pay $211_{C6}$/Charge Bill $211_{S6}$, including: (1) a Charging capability associated with Customer entity type $316_1$ and Service entity type $316_2$, and (2) a Billing Management (Billing Mgmt) capability associated with Service entity type $316_2$. The service provider capabilities 215 include one service provider capability associated with Get/Agree $211_{C3}$/Fulfill/Order $211_{S3}$, Consume $211_{C4}$/Customer Manage $211_{S4}$, Use/Support $211_{C5}$/Service Assurance $211_{S5}$, and Pay $211_{C6}$/Charge Bill $211_{S6}$, namely, a Service Desk capability associated with Customer entity type $316_1$. The service provider capabilities 215 include one service provider capability associated with Reward $211_{C7}$/Retain Optimize $211_{Sy}$, namely, a Retention and Loyalty Management (Retention/Loyalty) capability associated with Customer entity type $316_1$ and Service entity type $316_2$. The service provider capabilities 215 include one service provider capability associated with Leave $211_{C8}$, namely, a Decommission capability associated with Customer entity type $316_1$ and Service entity type $316_2$.

As described herein, the service provider capabilities 215 are identified in a manner for classifying the service provider capabilities 215 depending on whether the service provider capabilities 215 directly or indirectly impact customer experience touchpoints 214.

In one embodiment, service provider capabilities 215 that directly impact customer experience touchpoints 214 (denoted as service provider capabilities $215_D$ directly impacting customer experience touchpoints 214) are those capabilities in which the service provider has direct contact with the customer within the context of providing the customer experience to the customer. As depicted in FIG. 3, examples of service provider capabilities $215_D$ directly impacting customer experience touchpoints 214 include Brand Management, Strategy/Planning, Marketing/Campaign Management, Product/Offer, Distribute Channels, Service Design, Order Management, Release Management, Change Management, Customer Satisfy, Customer Information Management, Incident Management, Problem Management, Device Management, Third Party Support Management, SLA Management, Available Management, SQE/SQM, Security Management, Service desk, Charging, Billing Management, and Retention/Loyalty Management.

In one embodiment, service provider capabilities 215 that indirectly impact customer experience touchpoints 214 (denoted as service provider capabilities $215_I$ indirectly impacting customer experience touchpoints 214) are those capabilities which support the ability of the service provider to provide the customer experience to the customer. As depicted in FIG. 3, examples of service provider capabilities $215_I$ indirectly impacting customer experience touchpoints 214 include Portfolio Management, Service Deployment, Service Testing, Resource Deployment, Resource Testing, Third-Party Integrate, Configuration Management, Network Design, Knowledge Management, Administration/Maintenance, Event Management, Capacity Planning/Management, Continuity Management and Decommission.

Although primarily depicted and described with respect to specific numbers and types of service provider capabilities 215, it is noted that any other suitable numbers and/or types of service provider capabilities 215 may be used. Although primarily depicted and described with respect to specific classifications of service provider capabilities 215 (e.g., in terms of categories 111 of lifecycles 210 and entity types 316), it is noted that any other suitable classifications of service provider capabilities 215 may be used (e.g., in terms of categories 111 of lifecycles 210 and/or entity types 316).

Although omitted from FIG. 2 for purposes of clarity, it is noted that each service provider capability 215 may include one or more service provider disciplines and, further, that each service provider discipline may be have one or more service provider discipline areas associated therewith. An exemplary service provider capability 215 is depicted and described with respect to FIG. 4.

Figure 4:
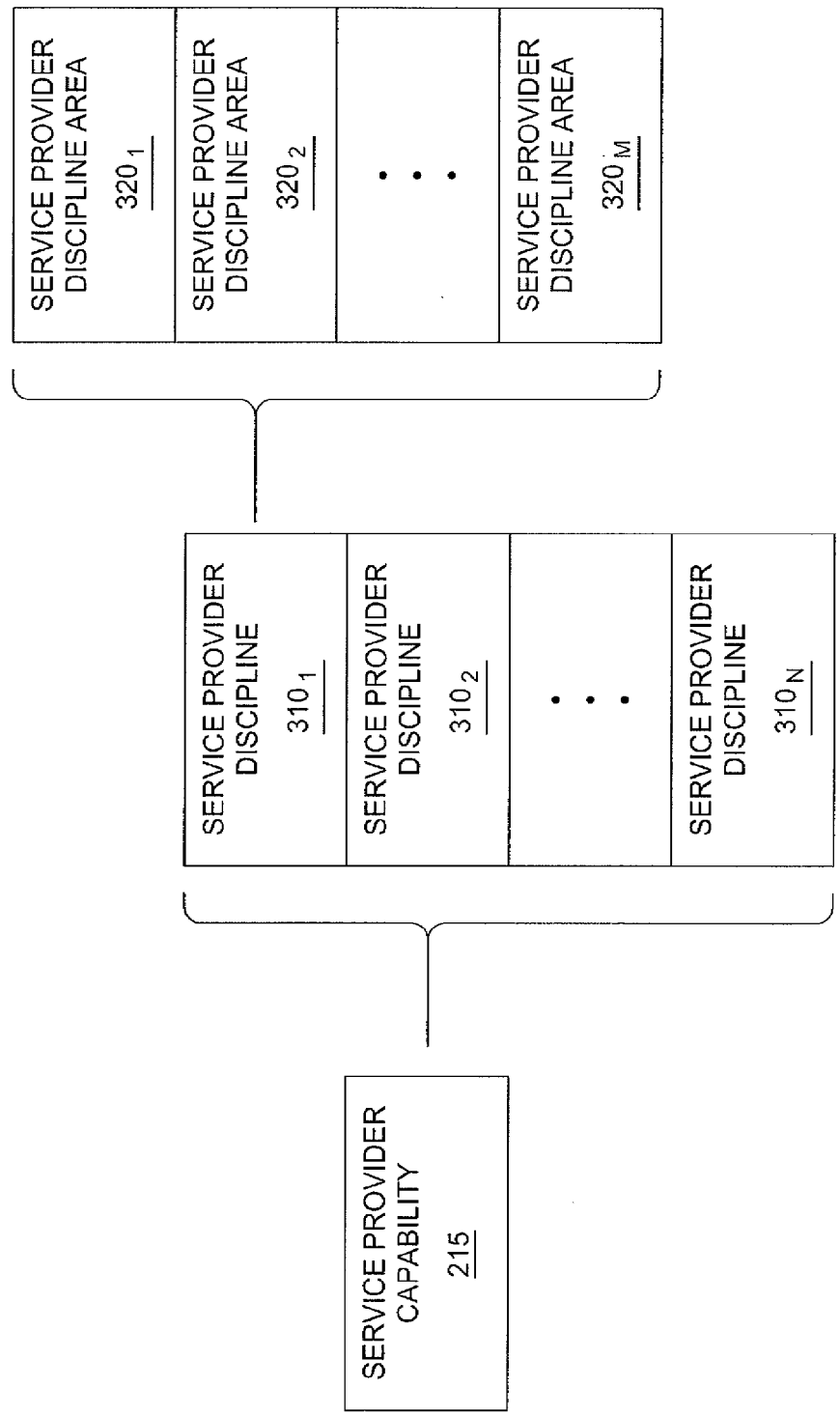
FIG. 4 depicts an exemplary service provider capability, illustrating service provider disciplines of which the service provider capability is composed and service provider discipline areas of which the service provider discipline is composed.

FIG. 4 depicts an exemplary service provider capability, illustrating service provider disciplines of which the service provider capability is composed and service provider discipline areas of which the service provider discipline is composed.

In one embodiment, a service provider capability 215 may have one or more service provider disciplines associated therewith. As depicted in FIG. 4, for example, the exemplary service provider capability 215 has a plurality of service provider disciplines $310_1$-$310_N$ (collectively, service provider disciplines 310) associated therewith. The service provider disciplines 310 of a service provider capability 215 represent various areas within the service provider capability 215 which define various aspects which make up the service provider capability 215. For example, the Problem Management capability may include service provider disciplines 310 such as Problem Acceptance, Root Cause Analysis, Known Error Control, Systems, Reporting, and Resources. For example, the Brand Management capability may include service provider disciplines 310 such as Segmentation Management, Market Innovation, and Brand Image Targeting. The service provider disciplines 310 of a given service provider capability 215 will be understood by one skilled in the art. It is noted that different service provider disciplines 310 may be included within any given service provider capability 215 under various conditions (e.g., for different service providers, for different types of service providers, for different services of focus, for different market segments of focus, and the like, as well as various combinations thereof). The service provider disciplines 310 may be better understood by way of reference to FIG. 5.

In one embodiment, a service provider discipline 310 may have one or more service provider discipline areas associated therewith. As depicted in FIG. 4, for example, the exemplary service provider discipline $310_1$ has a plurality of service provider discipline areas $320_1$-$320_M$ (collectively, service provider discipline areas 320) associated therewith. The service provider discipline areas 320 of a service provider discipline 310 represent various areas within the service provider discipline 310 which define various aspects which make up the service provider discipline 310. The service provider discipline areas 320 may be better understood by way of reference to FIG. 5.

It is noted that any of the service provider capabilities 215 of exemplary mapping 301 of FIG. 3 may be organized as depicted and described herein with respect to FIG. 4.

As described herein, exemplary mapping 301 of customer experience touchpoints to service provider capabilities is suitable for use as mapping 115 of FIG. 1.

Returning again to FIG. 1, it is noted that the output of step 120 is (1) a set $125_D$ of service provider capabilities (e.g., service provider capabilities $215_D$) identified as directly impacting customer experience touchpoints 214 and (2) a set $125_I$ of service provider capabilities (e.g., service provider capabilities $215_I$) identified as indirectly impacting customer experience touchpoints 214. The sets $125_D$ and $125_I$ may be referred to collectively as sets 125 of service provider capabilities (e.g., service provider capabilities 215) impacting customer experience touchpoints 214.

As depicted in FIG. 1, in steps $130_D$ and $130_I$ (which are depicted as being performed in parallel, but also may be performed serially) the sets 125 of service provider capabilities 215 (or service provider capabilities 215) impacting customer experience touchpoints 214 are processed for identifying, for each service provider capability 215 impacting customer experience touchpoints 214, one or more service provider disciplines associated with the service provider capability 215.

At step $130_D$, set $125_D$ of service provider capabilities $215_D$ identified as directly impacting customer experience touchpoints 214 is processed for identifying, for each service provider capability $215_D$ identified as directly impacting customer experience touchpoints 214, one or more service provider disciplines 310 associated with the service provider capability $215_D$ identified as directly impacting customer experience touchpoints 214. The output of step $130_D$ is a set $135_D$ of service provider disciplines 310 identified as directly impacting customer experience touchpoints 214. The set $135_D$ of service provider disciplines 310 identified as directly impacting customer experience touchpoints 214 may be organized on a per-capability basis where, for each service provider capability $215_D$ identified as directly impacting customer experience touchpoints 214, the associated service provider disciplines 310 identified for the service provider capability $215_D$ are specified.

At step $130_I$, set $125_I$ of service provider capabilities $215_I$ identified as indirectly impacting customer experience touchpoints 214 is processed for identifying, for each service provider capability $215_I$ identified as indirectly impacting customer experience touchpoints 214, one or more service provider disciplines 310 associated with the service provider capability $215_I$ identified as indirectly impacting customer experience touchpoints 214. The output of step 130, is a set $135_I$ of service provider disciplines 310 identified as indirectly impacting customer experience touchpoints 214. The set $135_I$ of service provider disciplines 310 identified as indirectly impacting customer experience touchpoints 214 may be organized on a per-capability basis where, for each service provider capability $215_I$ identified as indirectly impacting customer experience touchpoints 214, the associated service provider discipline or disciplines 310 identified for the service provider capability $215_I$ are specified.

The sets $135_D$ and $135_I$ may be referred to collectively as sets 135 of service provider disciplines. It is noted that each service provider capability 215 may have one or more service provider disciplines 310 associated therewith. It is further noted that, although omitted for purposes of clarity, one or more of the service provider discipline areas 320 also may be processed for identifying service provider discipline areas 320 directly impacting customer experience touchpoints 214 and/or for identifying service provider discipline areas 320 indirectly impacting customer experience touchpoints 214.

As depicted in FIG. 1, in steps $140_D$ and $140_I$ (which are depicted as being performed in parallel, but also may be performed serially) the sets 135 of service provider disciplines impacting customer experience touchpoints 214 are processed for determining aggregate performance scores 145.

At step $140_D$, a set $145_D$ of aggregate performance scores is determined for the set $125_D$ of service provider capabilities $215_D$ identified as directly impacting customer experience touchpoints 214.

The set $145_D$ of aggregate performance scores includes, for each service provider capability $215_D$ identified as directly impacting customer experience touchpoints 214, a capability performance score.

The capability performance score of a service provider capability $215_D$ identified as directly impacting customer experience touchpoints 214 is determined by (1) determining, for each of the service provider disciplines of which the service provider capability $215_D$ is composed, a discipline score for the service provider discipline and (2) aggregating the discipline performance scores determined for each of the service provider disciplines of which the service provider capability $215_D$ is composed. The set $145_D$ of aggregate performance scores also may be considered to include the discipline performance scores used to determine the capability performance scores.

The capability performance scores of the set $125_D$ of service provider capabilities $215_D$ identified as directly impacting customer experience touchpoints 214 may be aggregated to provide an overall performance score associated with the set $125_D$ of service provider capabilities $215_D$ identified as directly impacting customer experience touchpoints 214. The set $145_D$ of aggregate performance scores also may be considered to include the overall performance score associated with the set $125_D$ of service provider capabilities $215_D$ identified as directly impacting customer experience touchpoints 214.

At step $140_I$, a set $145_I$ of aggregate performance scores is determined for the set $125_I$ of service provider capabilities $215_I$ identified as indirectly impacting customer experience touchpoints 214.

The set $145_I$ of aggregate performance scores includes, for each service provider capability $215_I$ identified as indirectly impacting customer experience touchpoints 214, a capability performance score.

The capability performance score of a service provider capability $215_I$ identified as indirectly impacting customer experience touchpoints 214 is determined by (1) determining, for each of the service provider disciplines of which the service provider capability $215_I$ is composed, a discipline score for the service provider discipline and (2) aggregating the discipline performance scores determined for each of the service provider disciplines of which the service provider capability $215_I$ is composed. The set $145_I$ of aggregate performance scores also may be considered to include the discipline performance scores used to determine the capability performance scores.

The capability performance scores of the set $125_I$ of service provider capabilities $215_I$ identified as indirectly impacting customer experience touchpoints 214 may be aggregated to provide an overall performance score associated with the set $125_I$ of service provider capabilities $215_D$ identified as indirectly impacting customer experience touchpoints 214. The set $145_I$ of aggregate performance scores also may be considered to include the overall performance score associated with the set $125_I$ of service provider capabilities $215_I$ identified as indirectly impacting customer experience touchpoints 214.

An exemplary use of discipline performance scores of service provider disciplines of a service provider capability 215 to determine a capability performance score for the service provider capability 215 is depicted and described with respect to FIG. 4.

In one embodiment, a discipline performance score for a service provider discipline 310 of a service provider capability 215 is determined by evaluating one or more service provider discipline areas 320 of the service provider discipline 310. A service provider discipline area 320 of a service provider discipline 310 may be specified in any suitable manner. A service provider discipline area 320 of a service provider discipline 310 may be evaluated to determine a discipline area performance score for the service provider discipline area 320. The discipline area performance scores of the service provider discipline areas 320 of the service provider discipline 310 may then be aggregated (e.g., summed or combined in any other suitable manner) to form the discipline performance score for the service provider discipline 310.

In one embodiment, the service provider capabilities 215 are evaluated using a database of evaluation questions organized based on service provider disciplines 310 of which the service provider capabilities 215 are composed and, further, based on service provider discipline areas 320 of which the service provider. In this embodiment, the evaluation questions may be weighted (e.g., based on importance and/or impact to customer experience). In this embodiment, the evaluation questions may be scored in any suitable manner (e.g., automatically based on processing of input information related to operations of the service provider, manually by one or more consultants based on an interview process, and the like, as well as various combinations thereof).

As noted above, the discipline performance score for the service provider discipline may then be determined by aggregating the discipline area performance scores of the service provider discipline areas 320 of which the service provider discipline 310 is composed (e.g., via summing of the discipline area performance scores or in any other suitable aggregation of the discipline area performance scores).

As noted above, the capability performance score for the service provider capability 215 may then be determined by aggregating the discipline performance scores of the disciplines of which the service provider capability 215 is composed.

In one embodiment, a service provider discipline area 320 of a service provider discipline 310 is evaluated for determining a state of maturity of the service provider discipline area 320.

The state of maturity of a service provider discipline area 320 may be evaluated in any suitable manner. In one embodiment, the state of maturity of a service provider discipline area 320 may be evaluated by obtaining one or more answers to one or more questions for the service provider discipline area 320. In this embodiment, the question for a service provider discipline area 320 may focus on an element within the service provider discipline 310 which can be assessed for its level of maturity.

The state of maturity of a service provider discipline area 320 may be specified using a discipline area evaluation score (which also may be referred to herein as a discipline area maturity score). The discipline area evaluation score may be specified as any suitable type of value from any suitable set of values which may be used to evaluate the service provider discipline area 320. In one embodiment, for example, the set of discipline area evaluation score values may be implemented as a numeric range from zero through five, which the values being defined as follows: (0) zero indicates no compliance with the service provider discipline area 320, (1) one indicates some compliance where the service provider is reactive with respect to the service provider discipline, (2) two indicates some compliance where the service provider is at least partially proactive with respect to the service provider discipline (e.g., evidence of thresholds, trend analysis, and the like), (3) three indicates some compliance where the service provider is at least partially proactive with respect to the service provider discipline and more proactive than a discipline area evaluation score value of two (e.g., use of service models by the service provider), and (4) four indicates a high degree of compliance (e.g., use of a valued business model by the service provider). It is noted that these values may be defined in any other suitable manner. It is noted that any other suitable range of values may be used. It is noted that any other suitable types of values may be used.

In one embodiment, evaluation of a service provider discipline area 320 of a service provider discipline 310 is performed using weighting of the service provider discipline areas 320 of the service provider discipline 310. The weighting of the discipline areas of the service provider discipline 310 may be provided in the form of a discipline area weight associated with each service provider discipline area 320 of the service provider discipline 310. The discipline area weight of a service provider discipline area 320 may be specified as any suitable type of value from any suitable set of values which may be used to weight the service provider discipline areas 320 of the service provider discipline 310. In one embodiment, for example, the set of discipline area weight values may be implemented as a set of values as follows: (a) a value of four (4) indicates that maturity of the service provider discipline area 320 is essential to ensuring the maturity of the service provider discipline 310, (b) a value of two (2) indicates that maturity of the service provider discipline area 320 is recommended for ensuring the maturity of the service provider discipline 310, and (c) a value of one (1) indicates that the maturity of the service provider discipline area 320 is desirable for ensuring the maturity of the service provider discipline. It is noted that these values may be defined in any other suitable manner. It is noted that any other suitable number of values may be used. It is noted that any other suitable types of values may be used.

In one embodiment, in which evaluation of a service provider discipline area 320 of a service provider discipline 310 is performed using a discipline area evaluation score without weighting of the service provider discipline area 320, the discipline area performance score of the service provider discipline area 320 is the discipline area evaluation score value of the service provider discipline area 320.

In one embodiment, in which evaluation of a service provider discipline area 320 of a service provider discipline 310 is performed using a discipline area evaluation score determined for the service provider discipline area 320 and a weighting of the service provider discipline area 320, the discipline area performance score of the service provider discipline area 320 is computed as a product of the discipline area evaluation score value of the service provider discipline area 320 and the discipline area weighting value of the service provider discipline area 320.

Figure 5:
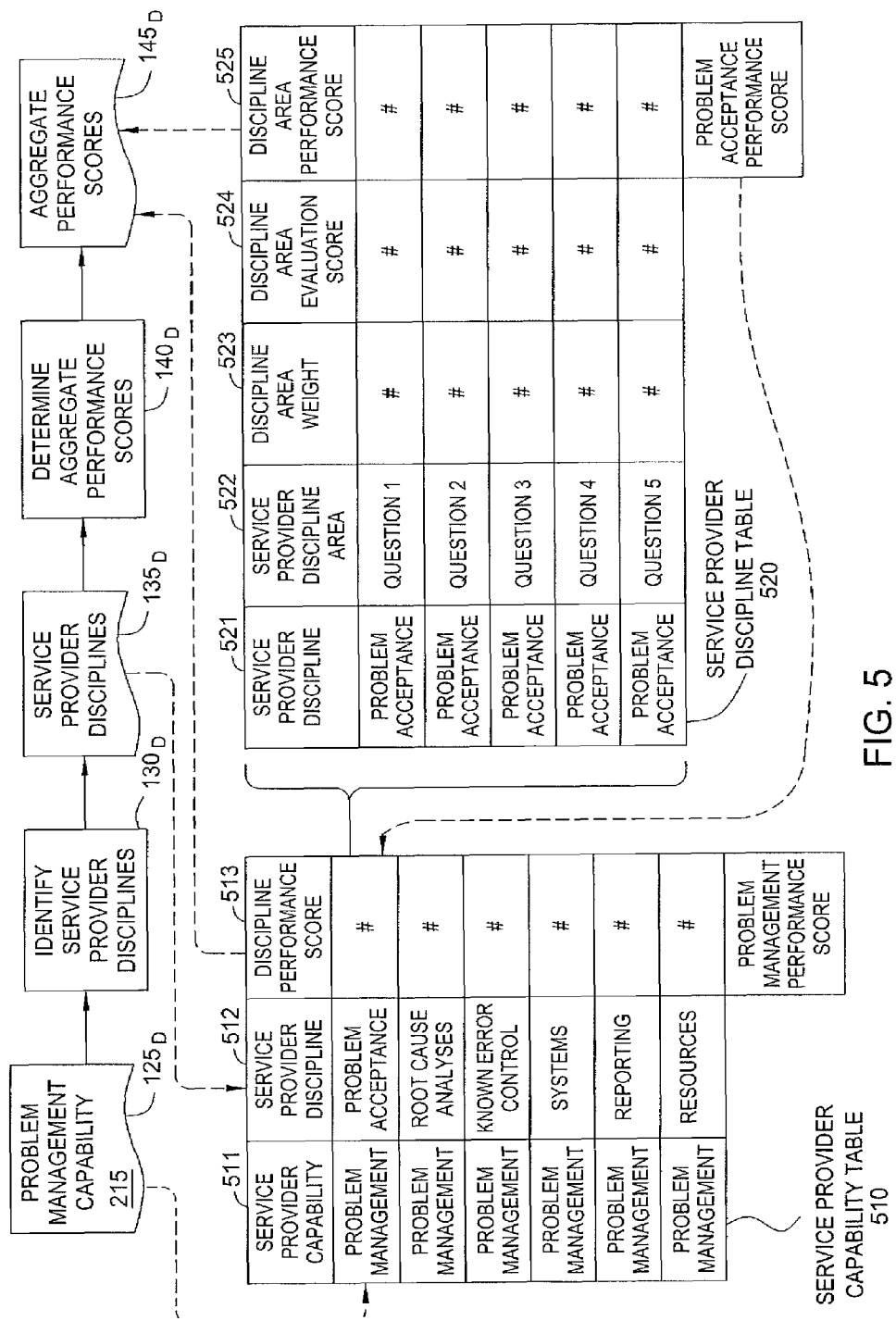
FIG. 5 depicts an exemplary use of discipline performance scores of service provider disciplines of an exemplary service provider capability to determine a capability performance score for the exemplary service provider capability.

FIG. 5 depicts an exemplary use of discipline performance scores of service provider disciplines of an exemplary service provider capability to determine a capability performance score for the exemplary service provider capability.

As depicted in FIG. 5, exemplary use of discipline performance scores of service provider disciplines of an exemplary service provider capability to determine a capability performance score for the exemplary service provider capability is described within the context of a portion of method 100 of FIG. 1 (namely, elements $125_D$, $130_D$, $135_D$, $140_D$, and $145_D$ are depicted for the exemplary service provider capability).

As depicted in FIG. 5, the exemplary service provider capability 215 is the Problem Management (Problem Mgmt) capability which is identified as a service provider capability $215_D$ directly impacting the customer experience touchpoints 214.

The Problem Management capability includes six service provider disciplines 310 as follows: Problem Acceptance, Root Cause Analysis, Known Error Control, Systems, Reporting, and Resources. In FIG. 5, a service provider capability table 510 is used to organize information associated with the Problem Management capability. The service provider capability table 510 includes three columns as follows: a Service Provider Capability column 511, a Service Provider Discipline column 512, and a Discipline Performance Score column 513. The rows of the service provider capability table 510 include information for the six service provider disciplines, respectively. In each row of the service provider capability table 510, the Service Provider Capability column 511 is denoted as Problem Management. In the six rows of the service provider capability table 510, the Service Provider Discipline column 512 identifies the Problem Acceptance, Root Cause Analysis, Known Error Control, Systems, Reporting, and Resources disciplines, respectively. In the six rows of the service provider capability table 510, the Discipline Performance Score column 513 includes the discipline performance scores computed for the Problem Acceptance, Root Cause Analysis, Known Error Control, Systems, Reporting, and Resources disciplines, respectively.

The Problem Acceptance discipline includes five service provider discipline areas 320 defined in terms of questions adapted for evaluating the maturity of the Problem Acceptance discipline (denoted as Questions 1-5). For example, questions adapted for evaluating the maturity of the Problem Acceptance discipline may include a question as to whether all problems are recorded, a question as to whether identified problems are linked to incidents, and the like. In FIG. 5, a service provider discipline table 520 is used to organize information associated with the Problem Acceptance discipline. The service provider discipline table 520 includes five columns as follows: a Service Provider Discipline column 521, a Service Provider Discipline Area column 522, a Discipline Area Weight column 523, a Discipline Area Evaluation Score column 524, and a Discipline Area Performance Score column 525. The rows of the service provider discipline table 520 include information for the five service provider disciplines, respectively. In each row of the service provider discipline table 510, the Service Provider Discipline column 521 is denoted as Problem Acceptance. In the five rows of the service provider discipline table 520, the entries of the Service Provider Discipline Area column 522 identify the five areas of the Problem Acceptance discipline to be evaluated and scored in terms of maturity (which are depicted in the service provider discipline table 520 as being defined in terms of questions, but which may be defined or specified in any other suitable manner). In the five rows of the service provider discipline table 520, the entries of the Discipline Area Weight column 523 include the discipline area weights assigned to the five service provider discipline areas of the Problem Acceptance discipline, respectively. In the five rows of the service provider discipline table 520, the entries of the Discipline Area Evaluation Score column 524 identify the discipline area evaluation scores determined for the five service provider discipline areas of the Problem Acceptance discipline, respectively. In the five rows of the service provider discipline table 520, the entries of the Discipline Area Performance Score column 525 identify the discipline area performance scores determined for the five service provider discipline areas of the Problem Acceptance discipline, respectively.

It is noted that the service provider discipline areas 320 of the Root Cause Analysis, Known Error Control, Systems, Reporting, and Resources disciplines are omitted for purposes of clarity.

As depicted in FIG. 5, the discipline area performance scores are used to determine the discipline performance scores and, further, the discipline performance scores are used to determine a capability performance score for the exemplary Problem Management capability.

The discipline area performance scores are computed for each of the five service provider discipline areas of the Problem Acceptance discipline of the Problem Management capability. For each of the five service provider discipline areas, an associated discipline area weight is assigned thereto (as represented by the "#" symbols in the Discipline Area Weight column 523). For each of the five service provider discipline areas, an associated discipline area evaluation score is determined via evaluation of the service provider discipline area (the score also being represented by the "#" symbols in the Discipline Area Evaluation Score column 524). For each of the five service provider discipline areas, an associated discipline area performance score is computed as a product of the discipline area weight and the discipline area evaluation score associated therewith. A discipline performance score is then computed for the Problem Acceptance discipline using the discipline area performance scores of the five service provider discipline areas of the Problem Acceptance discipline (e.g., by summing the discipline area performance scores of the five service provider discipline areas of the Problem Acceptance discipline). Although omitted for purposes of clarity, it is noted that this process is repeated for each of the other service provider disciplines 310 (namely, for the Root Cause Analysis, Known Error Control, Systems, Reporting, and Resources disciplines), by evaluating the respective service provider discipline areas of each of the other service provider disciplines 310, to compute thereby the discipline performance scores of the other service provider disciplines 310, respectively. As depicted in FIG. 5, the six discipline performance scores of the six service provider disciplines are maintained in the six entries of the Discipline Performance Score column 513 of the service provider capability table 510.

The capability performance score is computed for the Problem Management capability using the six discipline performance scores of the service provider disciplines 310 of the service Problem Management capability (e.g., by summing the discipline performance scores of the service provider disciplines 310 of the Problem Management capability).

As further depicted in FIG. 5, the various scores are aggregated as aggregate performance scores associated with the Problem Management capability, which may include one of more of the capability performance score for the Problem Management capability, each of the discipline performance scores of the six service provider disciplines of the Problem Management capability, each of the discipline area performance scores of each of the six service provider disciplines of the Problem Management capability, and the like.

Although primarily depicted and described with respect to a specific number of service provider disciplines 310 per service provider capability 215 and a specific number of service provider discipline areas 320 per service provider discipline 310, it is noted that each service provider capability 215 may include any suitable number of service provider disciplines and, similarly, that each service provider discipline 310 may include any suitable number of service provider discipline areas 320.

Returning again to FIG. 1, it is noted that the set $145_D$ of aggregate performance scores and the set 145, of aggregate performance scores may be referred to collectively herein as sets 145 of aggregate performance scores, which are used as input to step 150.

At step 150, customer experience management of the service provider in managing the customer experience of the customer is analyzed.

The customer experience management of the service provider in managing the customer experience of the customer is analyzed using the sets 145 of aggregate performance scores. The customer experience management of the service provider in managing the customer experience of the customer also may be analyzed using any other information received and/or generated in conjunction with the preceding steps of method 100.

The analysis of the customer experience management of the service provider in managing the customer experience of the customer may be performed in any suitable manner.

In one embodiment, analysis of the customer experience management of the service provider in managing the customer experience of the customer may include determining a prioritization of service provider capabilities 215 (e.g., some or all of the service provider capabilities 215, across some or all of the categories $211_S$ of the service provider lifecycle$_{210S}$) with respect to each other by assessing each service provider capability 215 and then normalizing the service provider capabilities 215 with respect to each other for purposes of determining relative rankings of various strengths and/or weaknesses of the service provider capabilities 215.

In one embodiment, analysis of the customer experience management of the service provider in managing the customer experience of the customer may include comparison of the capability performance scores of the service provider capabilities for ranking the service provider capabilities according to importance and impact to customer experience. This also may include identification of weaknesses associated with service provider capabilities and actions for improving the weaknesses.

In one embodiment, analysis of the customer experience management of the service provider in managing the customer experience of the customer may include comparison of the discipline performance scores of the service provider disciplines of the service provider capabilities for ranking the service provider disciplines (e.g., within and/or across service provider capabilities) according to importance and impact to customer experience. This also may include identification of weaknesses associated with service provider disciplines and actions for improving the weaknesses.

The analysis of the customer experience management of the service provider results in customer experience management analysis results 155.

The customer experience management analysis results 155 may include prioritization of service provider capabilities 215 based upon the capability performance scores. The prioritization of service provider capabilities 215 may be specified across all or part of the service provider lifecycle $210_S$. The prioritization of service provider capabilities 215 may be specified within a given category $211_S$ of the service provider lifecycle $210_S$. The prioritization of service provider capabilities 215 may be specified for a group of categories $211_S$ of the service provider lifecycle $210_S$. The prioritization of service provider capabilities 215 based upon the capability performance scores may be specified at any suitable level of granularity.

The customer experience management analysis results 155 may include prioritization of service provider disciplines based upon the discipline performance scores of the service provider disciplines. The prioritization of service provider disciplines may be specified across all or part of the service provider lifecycle $210_S$. The prioritization of service provider disciplines may be specified for service provider disciplines within a given service provider capability 215. The prioritization of service provider disciplines may be specified for service provider disciplines of a group of service provider capabilities 215. The prioritization of service provider disciplines may be specified for all service provider disciplines all of the service provider capabilities 215 of the service provider lifecycle $210_S$. The prioritization of service provider capabilities 215 based upon the capability performance scores may be specified at any suitable level of granularity.

The customer experience management analysis results 155 may include identification of areas of strengths and/or weaknesses related to the ability of the service provider to manage the customer experience of the customer. For example, a strength may be indicated by a performance score being above a predetermined threshold. Similarly, a weakness may be indicated by a performance score being below a threshold.

The strengths and/or weaknesses may be specified on a per-category basis for one or more of the categories $211_S$ of the service provider lifecycle $210_S$. The strengths and/or weaknesses may be specified on a per-capability basis for one or more service provider capabilities 215. The strengths and/or weaknesses may be specified on a per-discipline basis for one or more disciplines of one or more service provider capabilities 215. The strengths and/or weaknesses may be specified on a per-discipline area basis for one or more service provider discipline areas 320 of one or more service provider disciplines 310 of one or more service provider capabilities 215. It is noted that the customer experience management analysis results 155 may include combinations of such information. The strengths and/or weaknesses may be tabulated and/or configured for presentation in any other suitable manner.

The customer experience management analysis results 155 may include a prioritized ranking of service provider capabilities highlighting the strengths and/or weaknesses across service provider capabilities and/or within service provider capabilities.

The customer experience management analysis results 155 are provided as input to step 170.

At step 160 (an optional step), customer experience management of the service provider in managing the customer experience of the customer is analyzed for benchmarking against metrics.

The customer experience management of the service provider in managing the customer experience of the customer may be analyzed for benchmarking against metrics using the sets 145 of aggregate performance scores and one or more associated sets of benchmarks/metrics. The customer experience management of the service provider in managing the customer experience of the customer also may be analyzed for benchmarking against metrics using any other information received and/or generated in conjunction with the preceding steps of method 100.

In one embodiment, analysis of customer experience management for benchmarking against metrics may include mapping of service provider capabilities by metrics as compared to associated benchmarks. The metrics may include any suitable types of metrics. In one embodiment, the metrics may include Key Performance Indicators (KPIs). The KPI performance of service provider capabilities may be compared to industry benchmarks. The KPIs used for benchmarking may include any suitable types and number of KPIs. The KPIs used for benchmarking may be selected based on relevance to the service provider capabilities being analyzed. The capability metrics of the service provider capabilities may be compared to the benchmarks of the associated KPIs for identifying the relative ranking of the service provider to its peers (e.g., market peers, global peers, and the like) regarding service provider capabilities related to customer experience. It is noted that such benchmarks may be determined from any suitable source (and may be the result of participation in global forums, consulting engagements, solution implementation, and the like, as well as various combinations thereof).

The analysis of the customer experience management of the service provider for benchmarking against metrics results in customer experience management benchmarking results 165. The customer experience management benchmarking results 165 may include any information described as being evaluated and/or output during analysis of the customer experience management of the service provider for benchmarking against metrics.

The customer experience management benchmarking results 165 may be provided as input to step 170.

At step 170, an action plan for customer experience management is determined.

The action plan for customer experience management is determined using customer experience management analysis results 155 and optionally, customer experience management benchmarking results 165. The action plan for customer experience management also may be determined using any other information received and/or generated in conjunction with the preceding steps of method 100.

The action plan may be specified in terms of action plan results 175, which are depicted as being the final output of method 100 of FIG. 1.

The action plan results 175 may include customer experience management analysis results 155. The action plan results 175 may include customer experience management benchmark results 165. The action plan results 175 may include any other suitable information associated with the evaluation of the customer experience management of the service provider.

The action plan results 175 may specify one or more recommended improvement actions identified from the customer experience management analysis results 155. The improvement actions may be specified at a service provider capability level, a service provider discipline level, and/or a service provider discipline area level. The improvement actions may be prioritized at any suitable level and/or across levels.

The action plan results 175 may be organized in any suitable manner (e.g., using spreadsheets, charts, text documents, and the like, as well as various combinations thereof).

With respect to method 100, it is noted that various results produced during method 100, including various intermediate and final results, may be organized and presented in any suitable manner.

Figure 6:
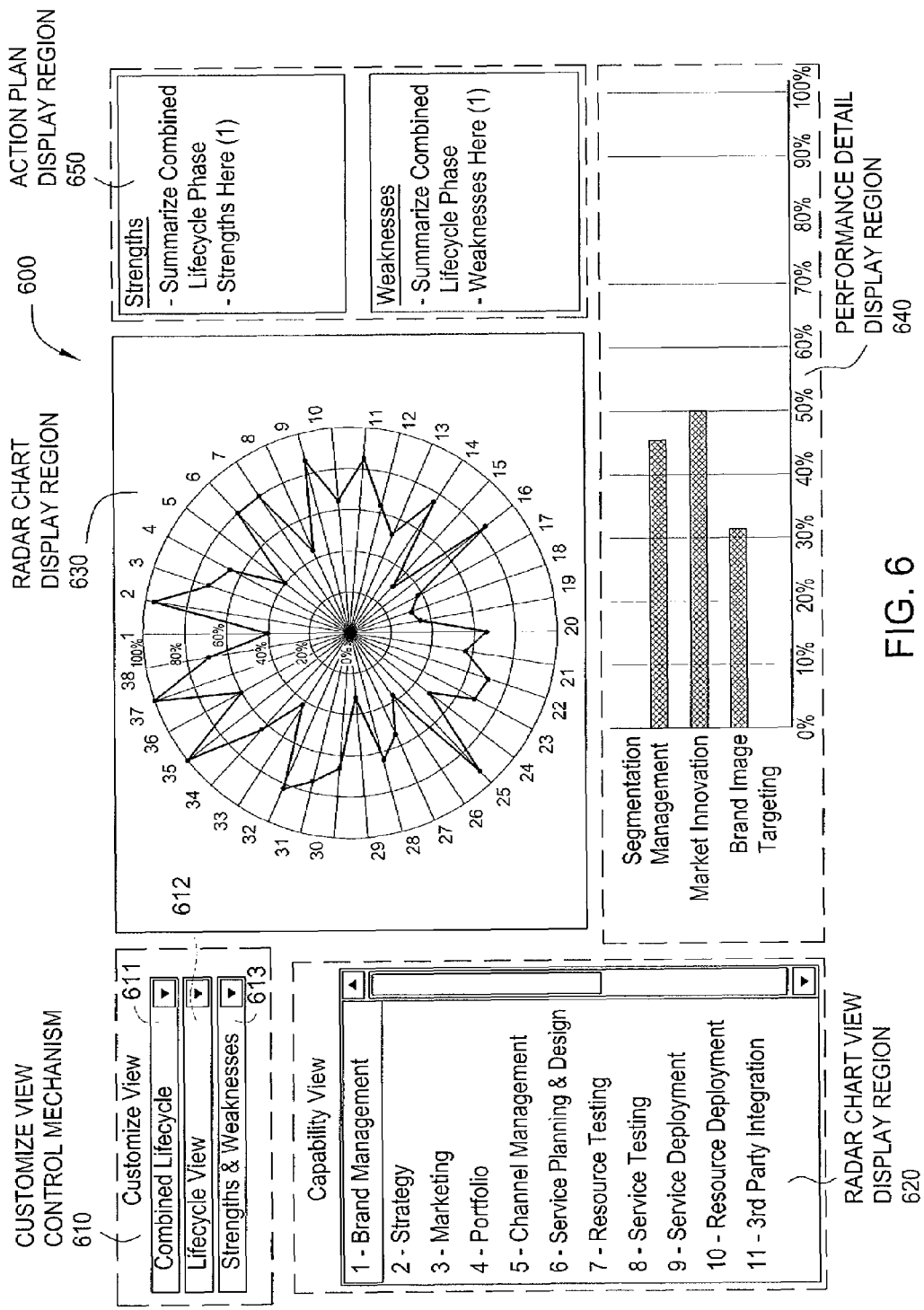
FIG. 6 depicts an exemplary interface for presentation of customer experience management analysis results and action plan results.

FIG. 6 depicts an exemplary interface for presentation of customer experience management analysis results and action plan results.

As depicted in FIG. 6, the exemplary interface 600 is configured to present various results of method 100 using an interactive, customizable set of radar charts configured to present customer experience management analysis results and which are supplemented with action plan results (e.g., strength and weakness information). It is noted that such information may be presented at any suitable granularity.

The exemplary interface 600 includes a Customize View control mechanism 610, a Radar Chart View display region 620, a Radar Chart display region 630, a Performance Detail display region 640, and an Action Plan display region 650. Although primarily depicted and described as display regions, it is noted that one or more of the Radar Chart View display region 620, the Radar Chart display region 630, the Performance Detail display region 640, and the Action Plan display region 650 may be controllable (e.g., to change the arrangement of information displayed in one or more of these display regions, to change the type and/or granularity of information displayed in one or more of these display regions, the size and locations of display regions, and the like, as well as various combinations thereof).

The Customize View control mechanism 610 includes three dropdown boxes via which a user may control various aspects of the Radar Chart View display region 620, the Radar Chart display region 630, the Performance Detail display region 640, and the Action Plan display region 650.

For example, a first dropdown box 611 and a second dropdown box 612 may be configured to enable control of the granularity of information that is presented in the Radar Chart View display region 620 and the Radar Chart display region 630. For example, presentation of a list of categories 211 of all or part of the lifecycle 210 in the Radar Chart View display region 620 and presentation of a Radar Chart representing categories 211 of all or part of the lifecycle 210 in the Radar Chart display region 630, presentation of a list of service provider capabilities 215 of all or part of the lifecycle 210 in the Radar Chart View display region 620 and presentation of a Radar Chart representing service provider capabilities 215 of all or part of the lifecycle 210 in the Radar Chart display region 630, presentation of a list of service provider capabilities 215 of a particular category or set of categories 211 of the lifecycle 210 in the Radar Chart View display region 620 and presentation of a Radar Chart representing service provider capabilities 215 of a particular category or set of categories 211 of the lifecycle 210 in the Radar Chart display region 630, presentation of a list disciplines 310 of all or part of lifecycle 210 in the Radar Chart View display region 620 and presentation of a Radar Chart representing disciplines 310 of all or part of lifecycle 210 in the Radar Chart display region 630, presentation of a list disciplines 310 of a particular capability 215 or set of capabilities 215 in the Radar Chart View display region 620 and presentation of a Radar Chart representing disciplines 310 of a particular capability 215 or set of capabilities 215 in the Radar Chart display region 630, and the like).

For example, a third dropdown box 613 may be configured to control the type of action plan results 175 presented via the Action Plan display region 650. For example, one or more of strengths, weaknesses, both strengths and weaknesses, or other information may be selected to be displayed.

The Radar Chart View display region 620 provides a list of items for which the associated performance scores are represented on the Radar Chart displayed in the Radar Chart display region 630. It is noted that the items may be at any suitable level of granularity. For example, the items may be categories 211 of the lifecycle 210 (in which case the Radar Chart View display region 620 provides a Category View and the Radar Chart of the Radar Chart display region 630 includes performance scores of the categories 211), service provider capabilities 215 of one or more categories 211 (in which case the Radar Chart View display region 620 provides a Capabilities View and the Radar Chart of the Radar Chart display region 630 includes performance scores of the capabilities 215), service provider disciplines 310 of one or more capabilities 215 (in which case the Radar Chart View display region 620 provides a Disciplines View and the Radar Chart of the Radar Chart display region 630 includes performance scores of the disciplines 310), and so forth. The items listed in the Radar Chart View display region 620 are selectable, thereby enabling the user to drill down to more detailed levels of information (e.g., from a Categories View to a Capabilities View of one or more service provider capabilities 215, from a Capabilities View to a Disciplines View of one or more service provider disciplines 310, and so forth).

The Radar Chart display region 630 is configured to display a radar chart. The radar chart that is displayed in Radar Chart display region 630 may be at any suitable granularity (e.g., a radar chart including performance scores for categories 211 of all or part of lifecycle 210, a radar chart including capability performance scores for service provider capabilities 215 for all or part of lifecycle 210, a radar chart including discipline performance scores for service provider disciplines 310 of one or more service provider capabilities 215, and the like). The radar chart that is displayed in Radar Chart display region 630 may be controlled from the Customize View control mechanism 610 and/or the Radar Chart display region 620.

The Performance Detail display region 640 is configured to display details regarding an item selected in Radar Chart View display region 620 and/or Radar Chart display region 630. For example, where Radar Chart View display region 620 displays a list of categories 211 which are represented in a radar chart displayed in Radar Chart display region 630, Performance Detail display region 640 may include capability performance scores associated with capabilities of one of the categories selected from the list of categories. For example, where Radar Chart View display region 620 displays a list of service provider capabilities 215 which are represented in a radar chart displayed in Radar Chart display region 630, Performance Detail display region 640 may include discipline performance scores associated with disciplines 310 of one of the service provider capabilities 215 selected from the list of service provider capabilities 215. The Performance Detail display region 640 may display other types of information.

The Action Plan display region 650 is configured to display action plan results 175. For example, the Action Plan display region 650 may display strengths and weaknesses. For example, the Action Plan display region 650 may display strengths and weaknesses based on the information displayed in Radar Chart View display region 620 and/or Radar Chart display region 630. For example, the Action Plan display region 650 may display strengths and weaknesses associated with a list of categories 211 which are listed in Radar Chart View display region 620 and/or represented in a radar chart displayed in Radar Chart display region 630. For example, the Action Plan display region 650 may display strengths and weaknesses associated with a single category 211 selected from a list of categories 211 which are listed in Radar Chart View display region 620 and/or represented in a radar chart displayed in Radar Chart display region 630. For example, the Action Plan display region 650 may display strengths and weaknesses associated with a list of service provider capabilities 215 which are listed in Radar Chart View display region 620 and/or represented in a radar chart displayed in Radar Chart display region 630. For example, the Action Plan display region 650 may display strengths and weaknesses associated with a single service provider capability 215 selected from a list of service provider capabilities 215 which are listed in Radar Chart View display region 620 and/or represented in a radar chart displayed in Radar Chart display region 630. The Action Plan display region 650 may display other types of information.

As depicted in FIG. 6, the Customize View control mechanism 610 is set such that the first dropdown box 611 is set to Combined Lifecycle, the second dropdown box 612 is set to Capability View, and the third dropdown box 613 is set to Strengths and Weaknesses. The Radar Chart View display region 620 is a Capability View providing a list of service provider capabilities 215 for which the associated capability performance scores are represented on an associated radar chart displayed in the Radar Chart display region 630. In the Capability View of the Radar Chart View display region 620, the Brand Management capability is highlighted in the list of service provider capabilities 215, thereby resulting in (1) display of discipline performance scores for the Segmentation Management, Market Innovation, and Brand Image Targetting disciplines as displayed in the Performance Detail display region 640 and (2) display of strengths and weaknesses for the Brand Management capability in the Action Plan display region 650.

Returning again to FIG. 1, it is again noted that the action plan results 175 are the final output of the method 100 of FIG. 1. It is noted that the action plan results 175 may be implemented by the service provider to improve customer experience.

It is noted that the various inputs and/or outputs at various points of method 100 may be handled in any suitable manner (e.g., one or more of processed, stored, presented, transmitted, and the like, as well as various combinations thereof).

It is further noted that the various steps of method 100 may be executed in any suitable manner. For example, method 100 may be implemented using a general or special purpose digital information processing device or devices acting under appropriate instructions embodied in, e.g., firmware, hardware, or some combination of these, or a combination of these and software so as to provide a special purpose computing device.

Figure 7:
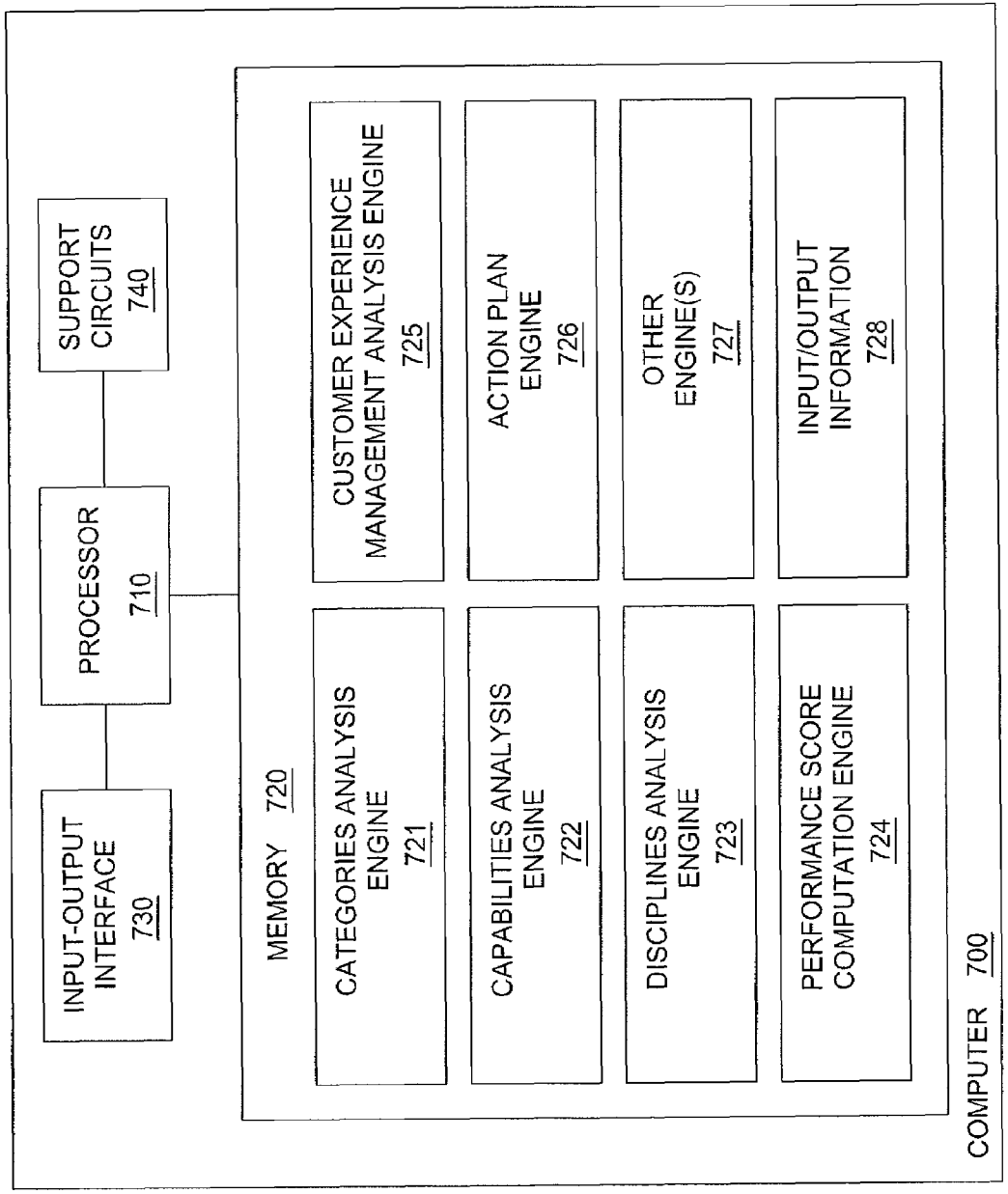
FIG. 7 depicts a high-level block diagram of a computer suitable for use in performing the functions described herein.

FIG. 7 depicts a high-level block diagram of a computer suitable for use in performing functions described herein. As depicted in FIG. 7, computer 700 includes a processor 710, a memory 720, an input/output interface 730, and support circuits 740. The processor 710 is coupled to the memory 720, the input/output interface 730, and the support circuits 740.

The processor 710 is adapted to cooperate with the memory 720 and, optionally, the input-output interface 730 and/or support circuits, to provide various functions of method 100.

The memory 720, generally speaking, stores engines and data related to execution of method 100.

The memory 720 includes a plurality of engines which may execute portions of method 100, including a Categories Analysis Engine 721, a Capabilities Analysis Engine 722, a Disciplines Analysis Engine 723, a Performance Score Computation Engine 724, a Customer Experience Management Analysis Engine 725, an Action Plan Engine 726, and Other Engines 727. For example, Categories Analysis Engine 721 may be configured to determine categories 211 of lifecycles 210, determine mapping 115, and the like. For example, Capabilities Analysis Engine 722 may be configured to perform step 120. For example, Disciplines Analysis Engine 723 may be configured to perform steps $130_D$ and $130_I$. For example, Performance Score Computation Engine 724 may be configured to perform steps $140_D$ and $140_I$. For example, Customer Experience Management Analysis Engine 725 may perform step 150 and, optionally, step 160. For example, Action Plan Engine 726 may perform step 170. For example, Other Engines 727 may be configured to perform various other functions related to method 100. Although depicted and described with respect to a specific number of engines, it will be appreciated that the functions performed by these engines may be distributed across these engines in any other suitable manner, combined into fewer engines, distributed across a larger number of engines, and the like, as well as various combinations thereof.

The memory 720 stores input/output information 728 associated with method 100. The input/output information 728 may include data which may be generated by and/or used by various ones and/or combinations of the engines of memory 720. The input/output information 728 may include mapping 115, set $125_D$ of service provider capabilities 215, sets 135 of service provider disciplines, aggregate performance scores 145, customer experience management analysis results 155, customer experience management benchmarking results 165, and action plan results 175.

In one embodiment, Categories Analysis Engine 721, Capabilities Analysis Engine 722, Disciplines Analysis Engine 723, Performance Score Computation Engine 724, Customer Experience Management Analysis Engine 725, Action Plan Engine 726, Other Engines 727 are implemented using software instructions stored in memory (e.g., memory 720) which may be executed by a processor (e.g., the processor 710) for performing the various functions depicted and described herein.

In one embodiment, computer 700 is configured to support one or more programmable spreadsheets which may be utilized within the context of the method 100 (e.g., to guide various portions of the assessment, to perform calculations associated with determining various scores during various portions of the assessment, to represent intermediate and/or final results of the assessment (e.g., aggregate performance scores 145, customer experience management analysis results 155, customer experience management benchmarking results 165, action plan results 175, and the like), and the like, as well as various combinations thereof).

Although depicted and described with respect to an embodiment in which each of the engines and associated input/output information is stored within memory 720, it will be appreciated that the engines and/or associated input/output information may be stored in one or more other storage devices internal to computer 700 and/or external to computer 700. The engines and/or and associated input/output information may be distributed across any suitable numbers and/or types of storage devices internal and/or external to computer 700.

Although depicted and described with respect to specific functions being performed by and/or using specific ones of the engines and associated input/output information of memory 220, it will be appreciated that any of the functions depicted and described herein may be performed by and/or using any one or more of the engines and associated input/output information of memory 220.

It will be appreciated that the engines may be activated in any suitable manner (e.g., automatically in response to one or more trigger conditions, in response to manual requests initiated by users, and the like, as well as various combinations thereof.

It is noted that, although primarily depicted and described with respect to use of specific service provider capabilities to assess customer experience management performed by the service provider, any suitable numbers/types of service provider capabilities may be used to assess customer experience management by the service provider. It is noted that different types of service providers may have different sets of service provider capabilities associated with their service provider lifecycles. It is noted that different types of service providers may identify different service provider capabilities as directly impacting customer experience touchpoints and may identify different service provider capabilities as indirectly impacting customer experience touchpoints. It is noted that the service provider capabilities of a service provider may evolve over time (e.g., existing service provider capabilities may no longer be used, new service provider capabilities may be added, service provider capabilities may be re-classified, and the like, as well as various combinations thereof).

It is noted that, although primarily depicted and described with respect to use of specific service provider disciplines to assess customer experience management performed by the service provider, any suitable numbers/types of service provider disciplines may be used to assess customer experience management by the service provider. It is noted that different types of service providers may have different sets of service provider disciplines associated with the service provider capabilities of their service provider lifecycles.

It is noted that various embodiments of the customer experience management capability depicted and described herein may be modified based on various characteristics of the service provider (e.g., the service focus of the service provider, the type of market within which the service provider operates, the specific market within which the service provider operates, the needs and/or desires of the service provider, and the like, as well as various combinations thereof).

It is noted that, in at least some embodiments, the references herein to a customer of a service provider may be considered to be a reference to a generic customer of the service provider, which may be representative of the one or more actual customers of the service provider (e.g., where the service provider is targeting customer experience improvement in general). Similarly, it is noted that, in at least some embodiments, the references herein to a customer of a service provider may be considered to be a reference to a specific customer of the service provider (e.g., where the service provider is targeting customer experience improvement in general for one or more specific customers).

Although primarily depicted and described herein with respect to service providers, it is noted that various embodiments of the customer experience management capability may be used to support customer experience management for any other suitable type(s) of provider(s) which may not necessarily be classified as service providers.

Figure 8:
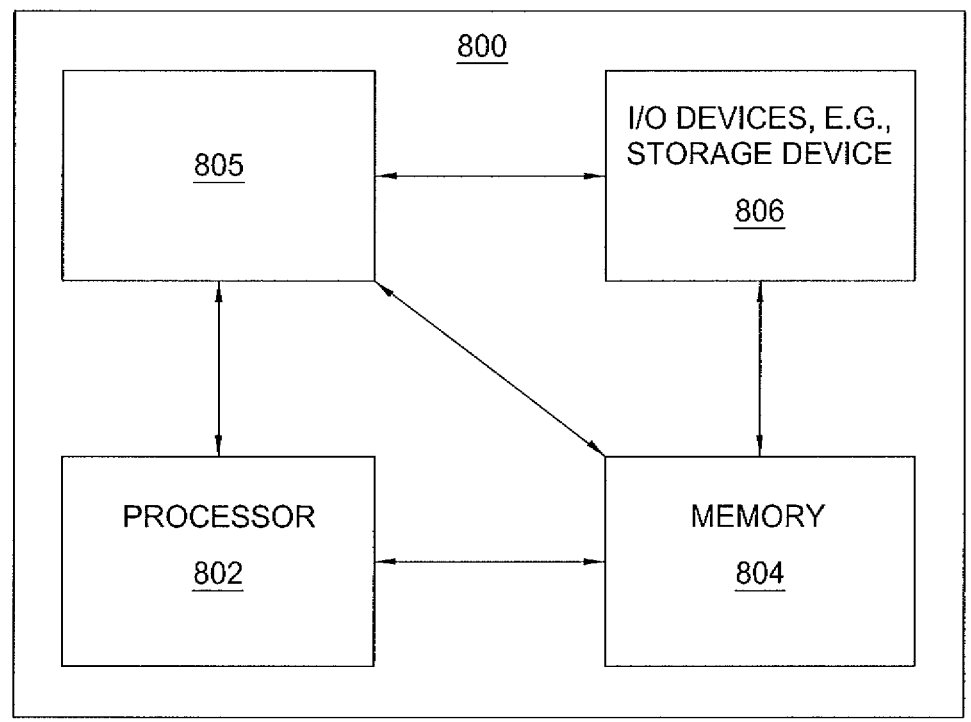
FIG. 8 depicts a high-level block diagram of a computer suitable for use in performing the functions described herein.

FIG. 8 depicts a high-level block diagram of a computer suitable for use in performing functions described herein.

As depicted in FIG. 8, computer 800 includes a processor element 802 (e.g., a central processing unit (CPU) and/or other suitable processor(s)) and a memory 804 (e.g., random access memory (RAM), read only memory (ROM), and the like). The computer 800 also may include a cooperating module/process 805 and/or various input/output devices 806 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in software (e.g., via implementation of software on one or more processors) and/or hardware (e.g., using a general purpose computer, one or more application specific integrated circuits (ASIC), and/or any other hardware equivalents).

It will be appreciated that the functions depicted and described herein may be implemented in software for executing on a general purpose computer (e.g., via execution by one or more processors) so as to implement a special purpose computer, and/or may be implemented in hardware (e.g., using one or more application specific integrated circuits (ASIC) and/or one or more other hardware equivalents).

In one embodiment, the cooperating process 805 can be loaded into memory 804 and executed by processor 802 to implement functions as discussed herein. Thus, cooperating process 805 (including associated data structures) can be stored on a computer readable storage medium, e.g., RAM memory, magnetic or optical drive or diskette, and the like.

It will be appreciated that computer 800 depicted in FIG. 8 provides a general architecture and functionality suitable for implementing functional elements described herein and/or portions of functional elements described herein. For example, the computer 800 provides a general architecture and functionality suitable for providing method 100 of FIG. 1.

It is noted that a variety of the functions described above with respect to the exemplary methods are readily carried out by general or special purpose digital information processing devices acting under appropriate instructions embodied in, e.g., firmware, hardware, or some combination of these, or a combination of these and software. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may include, without limitation, digital signal processor (DSP) hardware, application specific integrated circuit (ASIC) or other circuitry, field programmable gate array (FPGA), read only memory (ROM) for storing software, random access memory (RAM), non volatile storage, logic, and/or some other physical hardware component or module. For example, functional modules and the other logic circuits may be implemented as an ASIC constructed with semiconductor technology and also may be implemented with FPGAs and/or any other hardware blocks.

It is noted that an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as magnetic disks and magnetic tapes, hard drives, optically readable digital storage media, and the like.

It is noted that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

It is noted that specific structural and functional details disclosed herein are merely representative for purposes of describing embodiments of the customer experience management capability. Example embodiments of the customer experience management capability may be embodied in many alternative forms and should not be construed as being limited to only the embodiments set forth herein.

It is noted that, unless otherwise defined, all terms (including technical and scientific terms) used herein have the same meaning as commonly understood by one of ordinary skill in the art to which example embodiments pertain. It is noted that, in some alternative implementations of the example embodiments, the functions/acts noted may occur out of the order noted in the figures.

Although various embodiments which incorporate the teachings of the present invention have been shown and described in detail herein, those skilled in the art can readily devise many other varied embodiments that still incorporate these teachings.

What is claimed is:

1. An apparatus for evaluating customer experience management for a customer of a service provider, comprising:

a processor and a memory communicatively connected to the processor, wherein the processor is configured to:

identify a plurality of service provider capabilities of the service provider, wherein the service provider capabilities are associated with a lifecycle of a relationship between the customer and the service provider;

wherein the lifecycle comprises a service provider lifecycle portion having a plurality of service provider categories associated therewith and a customer lifecycle portion having a plurality of customer categories associated therewith;

wherein the service provider categories have a plurality of service provider capabilities associated therewith and the customer categories have a plurality of customer experience touchpoints associated therewith;

wherein the service provider capabilities are identified based on a mapping of the customer experience touchpoints to the service provider capabilities;

wherein, for at least one of the plurality of service provider capabilities, the service provider capability has associated therewith an indication as to whether the service provider capability directly or indirectly impacts at least one of the customer experience touchpoints;

determine aggregate performance score information comprising a plurality of capability performance scores associated with the respective plurality of service provider capabilities of the service provider; and generate customer experience management analysis results using at least a portion of the aggregate performance score information.

2. The apparatus of claim 1, wherein, for at least one of the service provider capabilities, the capability performance score of the service provider capability is computed as a sum of a plurality of discipline performance scores of a respective plurality of service provider disciplines associated with the service provider capability.

3. The apparatus of claim 2, wherein, for at least one of the service provider disciplines, the discipline performance score of the service provider discipline is computed as a sum of a plurality of discipline area performance scores of a respective plurality of discipline areas associated with the service provider discipline.

4. The apparatus of claim 3, wherein, for at least one of the service provider discipline areas, the discipline area performance score of the service provider discipline area is computed as a product of an importance weight associated with the service provider discipline area and a maturity level of the service provider discipline area.

5. The apparatus of claim 1, wherein the processor is configured to generate customer experience management analysis results using at least a portion of the aggregate performance score information by:

determining a prioritized ranking of the service provider capabilities based on the capability performance scores of the service provider capabilities.

6. The apparatus of claim 1, wherein the processor is configured to generate customer experience management analysis results using at least a portion of the aggregate performance score information by:

for at least one of the service provider capabilities, identifying at least one strength of the service provider capability related to impact of the service provider capability on the customer experience of the customer.

7. The apparatus of claim 1, wherein the processor is configured to generate customer experience management analysis results using at least a portion of the aggregate performance score information by:

for at least one of the service provider capabilities, identifying at least one weakness of the service provider capability related to impact of the service provider capability on the customer experience of the customer.

8. The apparatus of claim 1, wherein the processor is further configured to:

analyze customer experience management of the service provider for benchmarking against metrics, wherein customer experience management of the service provider is analyzed for benchmarking against metrics using at least a portion of the aggregate performance score information.

9. The apparatus of claim 1, wherein the processor is further configured to:

determine an action plan for customer experience management of the service provider using at least a portion of the customer experience management analysis results, wherein the action plan comprises one or more actions recommended for the service provider to improve the customer experience of the customer.

10. A non-transitory computer-readable storage medium storing instructions which, when executed by a computer, cause the computer to perform a method for evaluating customer experience management of a service provider, the method comprising:

identifying a plurality of service provider capabilities of the service provider, wherein the service provider capabilities are associated with a lifecycle of a relationship between the customer and the service provider;

wherein the lifecycle comprises a service provider lifecycle portion having a plurality of service provider categories associated therewith and a customer lifecycle portion having a plurality of customer categories associated therewith;

wherein the service provider categories have a plurality of service provider capabilities associated therewith and the customer categories have a plurality of customer experience touchpoints associated therewith;

wherein the service provider capabilities are identified based on a mapping of the customer experience touchpoints to the service provider capabilities;

wherein, for at least one of the plurality of service provider capabilities, the service provider capability has associated therewith an indication as to whether the service provider capability directly or indirectly impacts at least one of the customer experience touchpoints;

determining aggregate performance score information comprising a plurality of capability performance scores associated with the respective plurality of service provider capabilities of the service provider; and generating customer experience management analysis results using at least a portion of the aggregate performance score information.

11. An apparatus for evaluating customer experience management for a customer of a service provider, comprising:

a processor and a memory communicatively connected to the processor, wherein the processor is configured to:

determine aggregate performance score information comprising a plurality of capability performance scores associated with a respective plurality of service provider capabilities of the service provider, wherein the service provider capabilities are associated with a plurality of categories of a lifecycle of a relationship between the customer and the service provider, wherein the service provider capabilities are configured to support customer experience provided to the customer by the service provider;

wherein, for at least one of the service provider capabilities, the capability performance score of the service provider capability is computed as a sum of a plurality of discipline performance scores of a respective plurality of service provider disciplines associated with the service provider capability;

wherein, for at least one of the service provider disciplines, the discipline performance score of the service provider discipline is computed as a sum of a plurality of discipline area performance scores of a respective plurality of discipline areas associated with the service provider discipline;

wherein, for at least one of the service provider discipline areas, the discipline area performance score of the service provider discipline area is computed as a product of an importance weight associated with the service provider discipline area and a maturity level of the service provider discipline area; and generate customer experience management analysis results using at least a portion of the aggregate performance score information.

12. The apparatus of claim 11, wherein the lifecycle comprises:
a service provider lifecycle portion having a plurality of service provider categories associated therewith; and
a customer lifecycle portion having a plurality of customer categories associated therewith.

13. The apparatus of claim 12, wherein the service provider categories are mapped to the customer categories.

14. The apparatus of claim 13, wherein:
the customer categories have a plurality of customer experience touchpoints associated therewith; and
for at least one of the service provider capabilities, the service provider capability has associated therewith an indication as to whether the service provider capability directly or indirectly impacts at least one of the customer experience touchpoints.

15. The apparatus of claim 11, wherein the processor is configured to generate customer experience management analysis results using at least a portion of the aggregate performance score information by:
determining a prioritized ranking of the service provider capabilities based on the capability performance scores of the service provider capabilities.

16. The apparatus of claim 11, wherein the processor is configured to generate customer experience management analysis results using at least a portion of the aggregate performance score information by:
for at least one of the service provider capabilities, identifying at least one strength of the service provider capability related to impact of the service provider capability on the customer experience of the customer.

17. The apparatus of claim 11, wherein the processor is configured to generate customer experience management analysis results using at least a portion of the aggregate performance score information by:
for at least one of the service provider capabilities, identifying at least one weakness of the service provider capability related to impact of the service provider capability on the customer experience of the customer.

18. The apparatus of claim 11, wherein the processor is further configured to:
analyze customer experience management of the service provider for benchmarking against metrics, wherein customer experience management of the service provider is analyzed for benchmarking against metrics using at least a portion of the aggregate performance score information.

19. The apparatus of claim 11, wherein the processor is further configured to:
determine an action plan for customer experience management of the service provider using at least a portion of the customer experience management analysis results, wherein the action plan comprises one or more actions recommended for the service provider to improve the customer experience of the customer.

20. An apparatus for evaluating customer experience management for a customer of a service provider, comprising:
a processor and a memory communicatively connected to the processor, wherein the processor is configured to:
determine aggregate performance score information comprising a plurality of capability performance scores associated with a respective plurality of service provider capabilities of the service provider, wherein the service provider capabilities are associated with a plurality of categories of a lifecycle of a relationship between the customer and the service provider, wherein the service provider capabilities are configured to support customer experience provided to the customer by the service provider; and
generate customer experience management analysis results using at least a portion of the aggregate performance score information, wherein generating customer experience management analysis results using at least a portion of the aggregate performance score information comprises:
determining a prioritized ranking of the service provider capabilities based on the capability performance scores of the service provider capabilities and potential to positively impact the customer experience of the customer; and
for at least one of the service provider capabilities, identifying at least one of at least one strength of the service provider capability related to impact of the service provider capability on the customer experience of the customer or at least one weakness of the service provider capability related to impact of the service provider capability on the customer experience of the customer.

* * * * *